United States Patent
Feghali et al.

(10) Patent No.: US 9,407,602 B2
(45) Date of Patent: Aug. 2, 2016

(54) METHODS AND APPARATUS FOR REDIRECTING ATTACKS ON A NETWORK

(71) Applicant: Attivo Networks Inc., Fremont, CA (US)

(72) Inventors: Marc Feghali, San Jose, CA (US); Albert Young, Cupertino, CA (US); Mano Murthy, Fremont, CA (US); John F. Wakerly, Glenview, IL (US); Harihara Mahesh, San Jose, CA (US); Atul Shrivastava, Uttar Pradesh (IN)

(73) Assignee: ATTIVO NETWORKS, INC., Fremont, CA (US)

(*) Notice: Subject to any disclaimer, the term of this patent is extended or adjusted under 35 U.S.C. 154(b) by 105 days.

(21) Appl. No.: 14/074,532

(22) Filed: Nov. 7, 2013

(65) Prior Publication Data
US 2015/0128246 A1    May 7, 2015

(51) Int. Cl.
G06F 11/30 (2006.01)
H04L 29/06 (2006.01)

(52) U.S. Cl.
CPC ................................. *H04L 63/0209* (2013.01)

(58) Field of Classification Search
CPC . H04L 63/0209; H04L 63/1408; H04L 63/10; H04L 41/12; H04L 45/00
See application file for complete search history.

(56) References Cited

U.S. PATENT DOCUMENTS

| | | | | |
|---|---|---|---|---|
| 4,979,118 A * | 12/1990 | Kheradpir | ..................... | 701/117 |
| 5,311,593 A * | 5/1994 | Carmi | ........................... | 713/162 |
| 7,305,546 B1 * | 12/2007 | Miller | .......................... | 713/153 |
| 7,464,407 B2 * | 12/2008 | Nakae et al. | ..................... | 726/22 |
| 8,488,466 B2 * | 7/2013 | Breslin et al. | .................. | 370/235 |
| 8,732,296 B1 * | 5/2014 | Thomas et al. | ................ | 709/224 |
| 8,789,135 B1 * | 7/2014 | Pani | ................................... | 726/1 |
| 2002/0010800 A1 * | 1/2002 | Riley et al. | ..................... | 709/249 |
| 2002/0016826 A1 * | 2/2002 | Johansson et al. | ............ | 709/207 |
| 2002/0093917 A1 * | 7/2002 | Knobbe et al. | ................. | 370/252 |
| 2003/0065950 A1 * | 4/2003 | Yarborough | .................. | 713/201 |
| 2003/0152034 A1 * | 8/2003 | Zhang et al. | ................... | 370/252 |
| 2003/0223367 A1 * | 12/2003 | Shay et al. | ..................... | 370/231 |
| 2004/0172557 A1 * | 9/2004 | Nakae et al. | ................... | 713/201 |
| 2005/0050353 A1 * | 3/2005 | Thiele et al. | ................... | 713/201 |
| 2005/0076235 A1 * | 4/2005 | Ormazabal et al. | ........... | 713/201 |
| 2005/0076238 A1 * | 4/2005 | Ormazabal et al. | ........... | 713/201 |
| 2006/0126522 A1 * | 6/2006 | Oh | ................................. | 370/250 |
| 2006/0209701 A1 * | 9/2006 | Zhang et al. | ................... | 370/249 |
| 2006/0236401 A1 * | 10/2006 | Fosdick | ........................... | 726/25 |
| 2007/0097976 A1 * | 5/2007 | Wood et al. | .................... | 370/392 |
| 2007/0209070 A1 * | 9/2007 | Yadav | ............................. | 726/14 |

(Continued)

*Primary Examiner* — Taghi Arani
*Assistant Examiner* — Sharon Lynch
(74) *Attorney, Agent, or Firm* — David R. Stevens; Stevens Law Group

(57) ABSTRACT

A system is disclosed for protecting a network against malicious attacks or attempts for unauthorized access. A network is connected to an external network by a number of firewalls. Inspectors detect packets blocked by the firewalls and some or all of the packets are detected to a labyrinth configured to emulated an operational network and response to the packets in order to engage an attacker. Blocked packets may be detected by comparing packets entering and exiting a firewall. Packets for which a corresponding packets are not received within a transit delay may be identified as blocked. Entering and exiting packets may be compared by comparing only header information. A central module may receive information from the inspectors and generate statistical information and generate instructions for the inspectors, such as blacklists of addresses known to be used by attackers.

12 Claims, 16 Drawing Sheets

(56) References Cited

U.S. PATENT DOCUMENTS

| | | | |
|---|---|---|---|
| 2008/0046989 A1* | 2/2008 | Wahl | 726/7 |
| 2008/0060074 A1* | 3/2008 | Okuyama | 726/23 |
| 2008/0168559 A1* | 7/2008 | Touitou | H04L 63/0236 726/23 |
| 2009/0249470 A1* | 10/2009 | Litvin et al. | 726/13 |
| 2010/0122317 A1* | 5/2010 | Yadav | 726/1 |
| 2011/0138456 A1* | 6/2011 | Ormazabal et al. | 726/11 |
| 2011/0141937 A1* | 6/2011 | Breslin et al. | 370/252 |
| 2011/0219443 A1* | 9/2011 | Hampel et al. | 726/11 |
| 2012/0030750 A1* | 2/2012 | Bhargava et al. | 726/13 |
| 2012/0106377 A1* | 5/2012 | Sommers et al. | 370/252 |
| 2013/0242743 A1* | 9/2013 | Thomas et al. | 370/236 |
| 2013/0329732 A1* | 12/2013 | Vyas et al. | 370/392 |
| 2014/0157366 A1* | 6/2014 | Ko et al. | 726/3 |
| 2014/0259092 A1* | 9/2014 | Boucher et al. | 726/1 |

\* cited by examiner

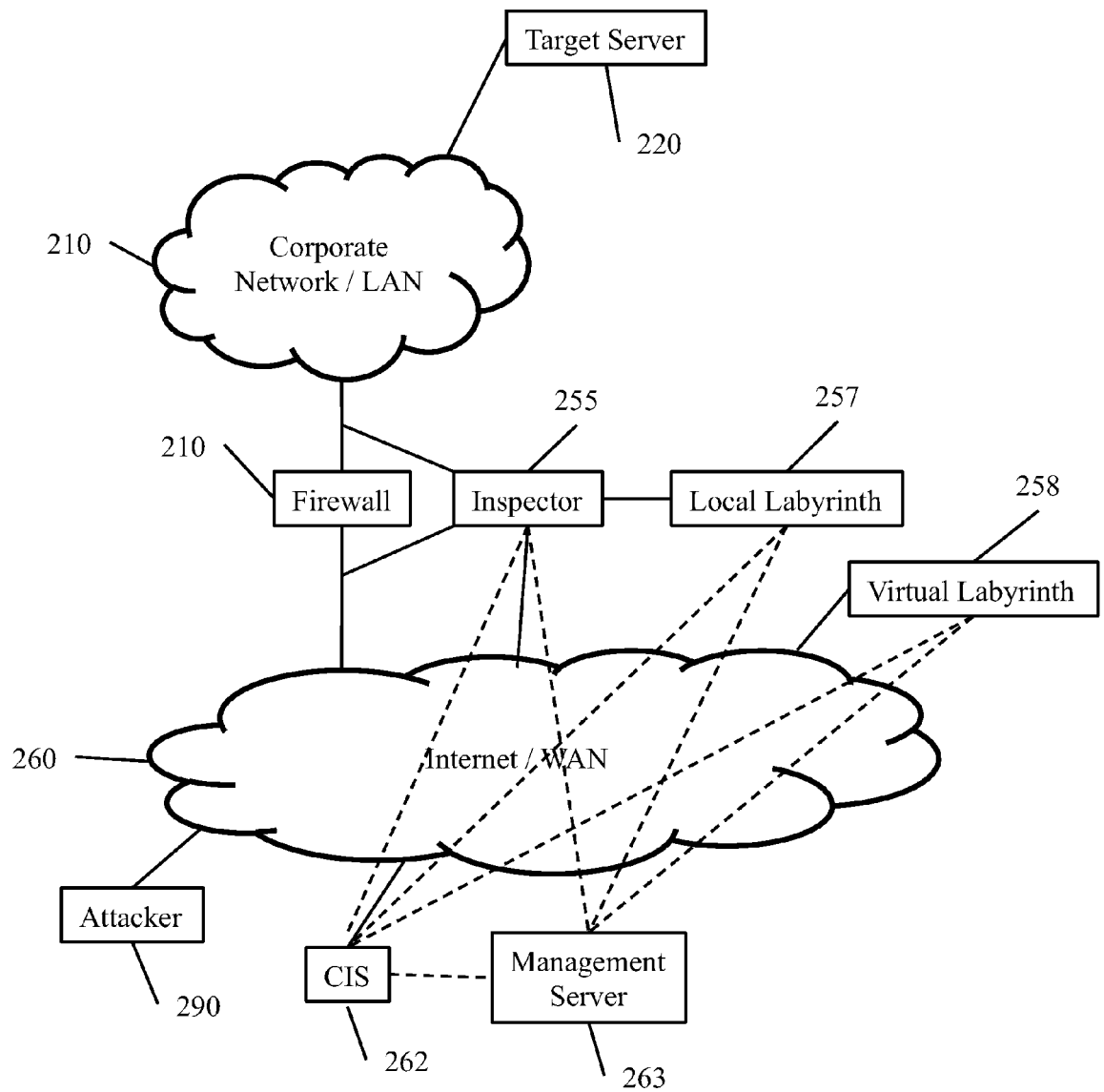
Figure 2 (Basic Architecture)

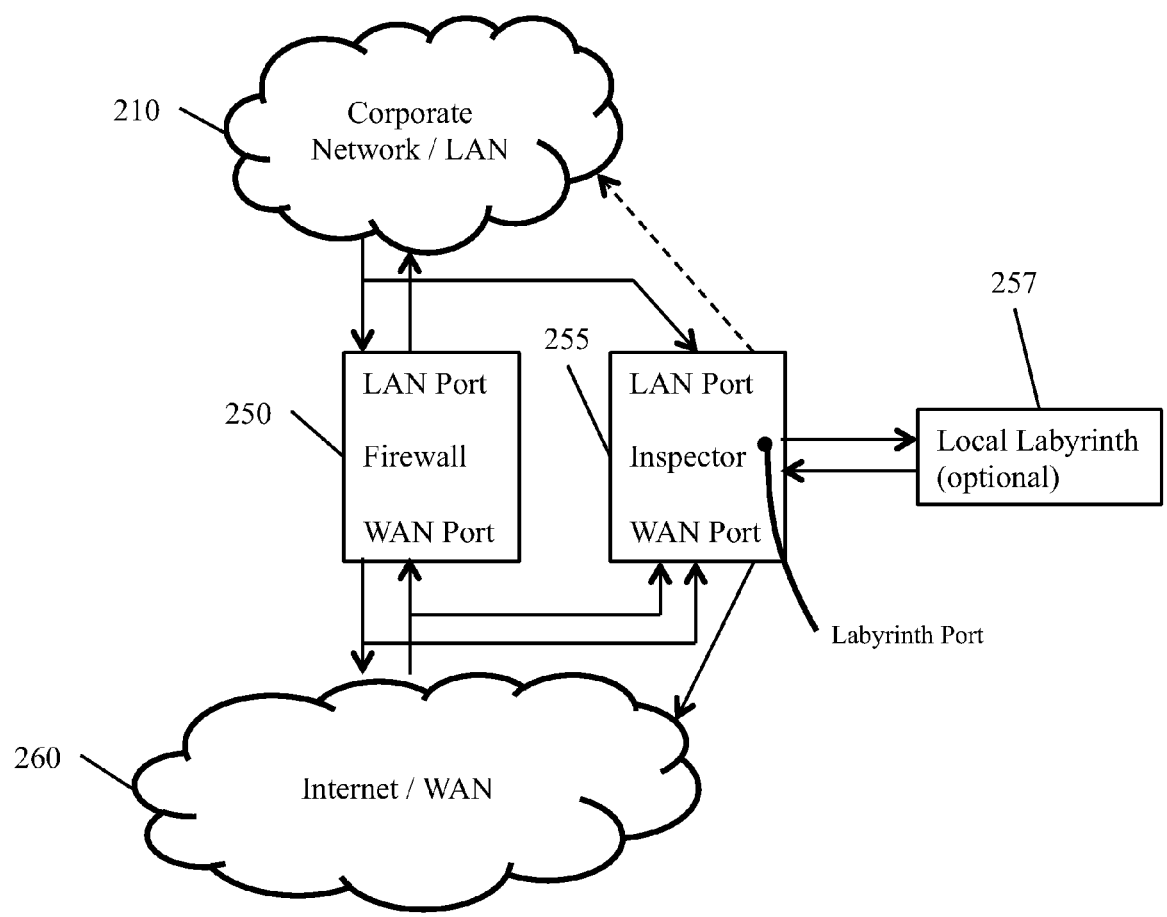
Figure 3A (Inspector Connection)

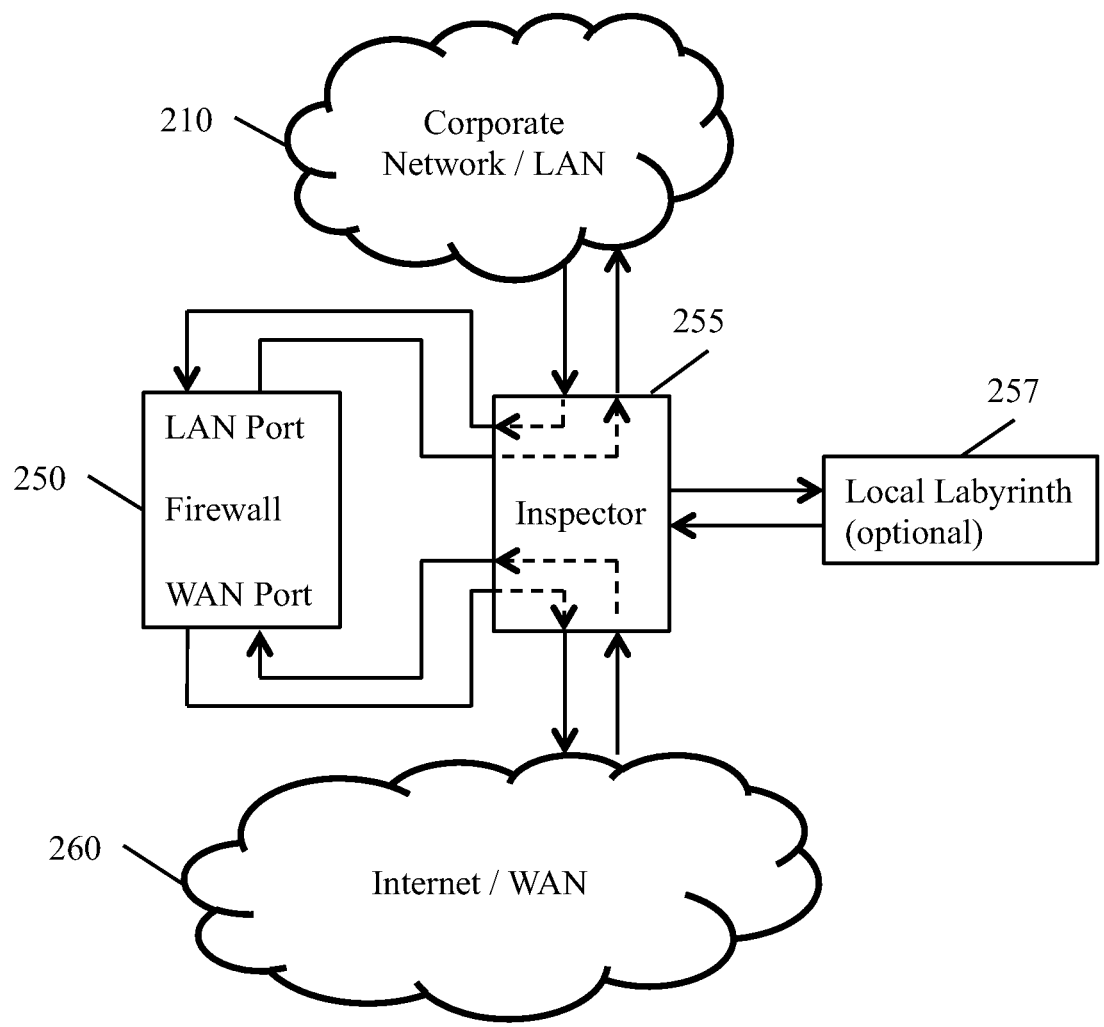
Figure 3B (Inspector Connection)

METHODS AND APPARATUS FOR REDIRECTING ATTACKS ON A NETWORK

BACKGROUND

1. Field of the Invention

This invention relates to systems and methods for preventing malicious or unauthorized access of a computer network.

2. Background of the Invention

Modern computer networks are generally connected to the Internet, both to give external users access to certain resources such as web servers, and to allow internal users to access external resources and communicate with external entities. However, not all access is desirable, and malicious external entities may attack a computer network in order to disrupt its operation or to gain unauthorized access to valuable information and resources in the network. Some attackers, such as rogue employees and physical or virtual agents of external attackers, may also have internal access to the physical network, and may use such access to facilitate theft of valuable information and resources.

The systems and methods described herein provide an improved approach for dealing with attacks on a network.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 2 is schematic block diagram of an architecture in accordance with an embodiment of the present invention;

FIGS. 3A through 3E are schematic diagrams of a configuration of an inspector and firewall in accordance with an embodiment of the present invention;

DETAILED DESCRIPTION

Figure 1:
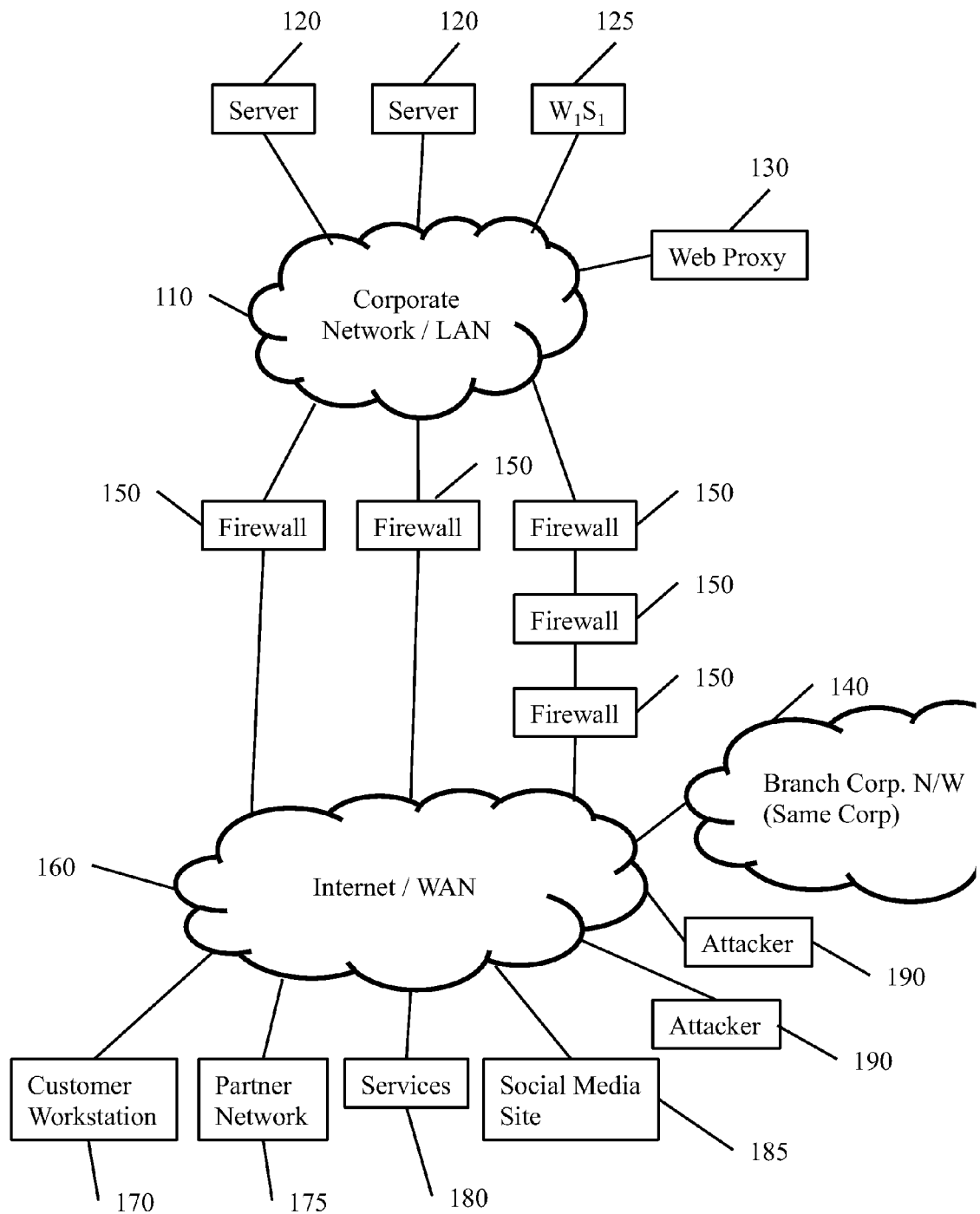
FIG. 1 is a schematic block diagram of network environment that may advantageously use systems and methods in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for responding to malicious attacks on a network.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 shows a corporate computer network 110 connected to the Internet 160. The corporate network 110 is drawn as a cloud, and particular devices are shown merely with connections to the cloud. The detailed interconnections of devices with each other and with routers, switches, and the like within the corporate network 110 may be made in a variety of ways as is understood in the art. Devices include servers 120, workstations 125, and web proxies 130. The "corporate" network 110 may belong to a corporation or to any other entity such as a government, military, educational, or non-profit organization.

The corporate network 110 may be referred to as the Local Area network (LAN), because its elements are often located at a single geographic site. The Internet 160 is drawn as a cloud, and may be referred to as the Wide Area Network (WAN), because it connects geographically dispersed sites.

While elements of a corporate network may be co-located at a single geographic site, they also may be located at multiple sites and connected to each other with private links. In the latter case, for the purposes of this application, the overall network may represented as a single "corporate network" cloud 110. If desired, embodiments disclosed herein may be used in such a private network to protect against internal threats, by treating certain internal networks, devices, and services with the same circumspection that is applied to the public Internet in the remainder of this disclosure, as will be understood by one skilled in the art. For clarity, however, the remainder of the disclosure will describe embodiments as if all threats are connected to the corporate network 110 via the public Internet 160.

In some cases, a multi-site corporate network may be implemented using the public Internet to provide connectivity between sites. In FIG. 1, the corporate network 110 may connect to another branch corporate network 140 of the same corporation across the public Internet 160, as shown explicitly in FIG. 1, using Virtual Private Network (VPN) technology such as Frame Relay, Asynchronous Transfer Mode (ATM), or Multiprotocol Label Switching (MPLS) as is understood in the art.

FIG. 1 shows firewall devices 150 positioned between the corporate network 110 and the Internet 160, typically inserted on each connection to the external network. The firewalls are also part of the corporate network. Typically there may be one or more edge routers, not shown, positioned between the Internet/WAN 160 and the firewalls 150 that is also part of corporate network (owned and managed by the same organization as the rest of the corporate network 110).

A firewall's function, as understood in the art, is to examine network traffic (packets) coming into and going out of the corporate network, and determining whether such traffic, on a packet-by-packet, session-by-session, or stream-by-stream basis, should be allowed to pass through. The firewall makes such determinations typically by examining part or all of the traffic and applying a set of rules that have been configured into the firewall. The outcomes of rule-based decisions typically include forwarding a packet to its intended destination, rejecting it with notification to the sender, or silently dropping it ("blocking" it).

In some configurations, multiple firewalls 150 from different suppliers are placed in series in an attempt to overcome deficiencies in any one supplier's device, such as an inadequate rule set or programming errors that allow undesirable traffic to "leak" through it. Thus, in further discussions of firewalls in this disclosure, a single firewall 150 may be understood potentially to be implemented with multiple firewalls.

In typical prior art, the firewall interface that connects to the corporate network may be called the "LAN side," and the firewall interface that connects to the Internet may be called the "WAN side." The purpose of the firewall is to protect corporate devices and information on the LAN side from attackers on the WAN side. A secondary purpose may be to prevent malicious users of the corporate network from sending corporate information to entities outside the corporate network.

FIG. 1 further shows the public Internet as a cloud 160 with many devices, services, and other networks connected to it. These include customer workstations 170, partner and vendor networks 175, third-party service providers 180, and social media sites 185. Also included are malicious individual users and organizations that are potential attackers 190 of the corporate network 110. Each of the devices, services, and other networks mentioned here may be directly connected to the Internet 160 as shown in the figure, or may communicate with the Internet though their own intervening corporate network, as is understood in the art.

Off-the-shelf application firewalls and intrusion detection products typically use a mixture of signature- and anomaly-based rules to identify malicious use of the application, and may reactively block malicious requests as well as issue alerts to administrators. These products can form a valuable layer of defense protecting a network and a web application. However, their effectiveness is normally limited.

By blocking an attacker, a prior-art firewall 150 gives valuable information to an attacker 190, namely that similar attacks will also be blocked. The attacker 190 can use this feedback to change its tactics and try a different approach, and perhaps eventually launch a successful attack. Moreover, this process can be automated, so that an attacker can try many potential tactics to gain access to the corporate network 110 without requiring any human intervention, until it finally gains access to something. At that point, depending on the type of resource that has been accessed, it may no longer be possible to continue the attack automatically, and the attacker may have to bring in a human operator to evaluate the newly discovered opportunity. Therefore, continuing from this point becomes more expensive for the attacker and deters the attacker if one or more opportunities are ultimately found not to be valuable. What is needed is a system that will engage attackers and force them to consume the attackers' valuable human and other resources without accessing or harming resources in the corporate network, with the goal of ultimately deterring such attackers.

Exemplary Basic Architecture

FIG. 2 shows an example of a basic architecture for implementing some or all of the embodiments disclosed herein. The embodiments disclosed herein may be applied to networks that have all or some of the elements in FIG. 1, but many elements have been omitted in FIG. 2 for clarity. FIG. 2 shows a corporate network 210, and only one server 220, which is the target of an external attack, is shown. The corporate network 210 is connected to the public Internet 260 through a prior-art firewall 250. An attacker 290 is connected to the Internet 260. In some cases, not shown in the figure, an attacker 290 may be connected the corporate network 210, for example, an unauthorized corporate user or a compromised workstation that is trying to send confidential corporate data to a destination in the Internet 260.

Some embodiments disclosed herein require no change to the structure and operation of the corporate network 210, the firewall 250, or the public Internet 260; that is, the corporate network 210, the firewall 250, and the public Internet 260 may have the same internal structure and operation as corresponding elements of the prior-art architecture which was described in connection with FIG. 1.

Embodiments disclosed herein may incorporate a new device, a packet inspector and redirector 255, hereinafter called an Inspector 255, which interfaces with the firewall 250, the corporate network 210, and the Internet 260, as described below. In the case of multiple firewall-protected connections between the corporate network and the Internet, as was shown in FIG. 1, a separate Inspector 255 may be provided for each connection.

The prior-art firewall 250 has packet traffic going into it on both the LAN 210 side and the WAN 260 side. In this disclosure, the word "traffic" denotes one or more packets. Further, such traffic is called "incoming" with respect to the firewall. To avoid confusion in this disclosure, the word "incoming" is used only to describe traffic that is going into the firewall. Also, the prior-art firewall 250 has traffic coming out of it on both the LAN 210 side and the WAN 260 side. In this disclosure, such traffic is called "outgoing" with respect to the firewall, and the word "outgoing" is used only to describe traffic that is going out of the firewall.

The Inspector 255 may have access to incoming and outgoing traffic on both the LAN 210 side and the WAN 260 side of the Firewall 250. It optionally also has access to a Local Labyrinth 257 and/or to a Virtual Labyrinth 258 in the cloud. Also in the cloud are a Cloud Inspector Service (CIS) 262 and a Management Server 263. The attacker 290 is also in the cloud. Compared to the prior art, the new elements in this architecture are the Inspector 255, the Local and Virtual Labyrinths 257 and 258, the Cloud Inspector Service (CIS) 262, and the Management Server 263.

The Inspector 255 has access to traffic being processed by the firewall 250. In particular, it can determine which incoming traffic on the WAN 260 side is being blocked from going out on the LAN 210 side by the firewall, and which incoming traffic on the LAN side is being blocked from going out on the WAN side. Means for making these determinations are described later, in connection with FIG. 3.

The purpose of the firewall 250 is to block traffic that is associated with an attacker 290. Blocking an attacker's traffic stops an attack, but perhaps only temporarily. The very fact that the traffic is blocked gives the attacker information that the attacker can use to redirect or restructure the attack more productively. For example, when an attacker requests to open a TCP connection on a particular IP port and the firewall blocks the request, the attacker can try a different IP port or try a different type of connection.

A purpose of the Inspector 255 to detect what's being blocked by the firewall 250, so that attacks may be further analyzed by systems according to embodiments described herein. In some embodiments, a further purpose is to redirect the blocked traffic to Labyrinth 257 or 258, to engage an attacker 290 in a way that forces the attacker to wastefully consume its own expensive resources. The initial stages of any attack are normally automated, which is relatively inexpensive. For example, the attacker may use a program to automatically probe a sequence of IP addresses (each potentially belonging to a different corporate workstation or server), and at each of these addresses probe a series of IP ports, looking for an "open" port where its request for a connection will be accepted. This is often called a "port-scan attack." Once the attacker's automated program finds such a port, it may alert a human operator (the attacker himself), who carefully tests the open port to see what kind of communications and functions might be performed on the port (for example, a login). This is a resource-intensive stage for the attacker, since it requires hands-on involvement.

Typical firewalls 250 have filters that detect and subsequently block port-scan attacks. The hope is that when the attacker receives no responses to its requests, it will give up. In the some embodiments, the Inspector 255 can detect that the firewall 250 is blocking packets from the attacker 290. Based on its internal policies, the Inspector 255 may then redirect these same packets to a Local Labyrinth 257 or to a Virtual Labyrinth 258 for further processing. The Labyrinth 257 or 258 is designed to emulate the environment of the corporate network 210, as seen from outside the corporate network 210, but to respond and perform actions that do not harm the entities in the real corporate network or give access to real information therein. This is similar to the prior-art "honeypot" or "honeynet" concept: a honeypot or honeynet is a trap set to detect, deflect, or in some manner counteract attempts at unauthorized use of information systems. A honeypot or honeynet generally consists of a computer, data, or a network site that appears to be part of a network, but is actually isolated and monitored, and which seems to contain information or a resource of value to attackers. Attackers' actions may be tracked and captured in Labyrinth; this information may be used for analysis of the attackers' behavior.

The Cloud Inspector Service (CIS) 262 gathers information from one or more Inspectors 255 in a corporate network and the corresponding Labyrinth 257/258, and correlates, synopsizes, and analyzes this information to provide more effective diversion and engagement of attackers. In this disclosure, the information that is transmitted from Inspectors 255 and Labyrinth 257 or 258 to the CIS 262 is called "telemetry." Depending on performance, economics, and other criteria, the CIS 262 may receive telemetry from and provide service for multiple corporate networks. The CIS 262 may communicate and correlate telemetry information with other CISs 262 as well as with public and other attack databases, such as SpamHaus, AlienVault. The CIS 262 may also share any of the information it generates or receives from any source with Inspectors 255, for example, so-called blacklists of IP addresses.

The Management Server 263 provides the corporate network manager with a means of configuring the Inspector 255, the Labyrinths 257 and 258, and the CIS 262. It also creates reports on system operation and attack activity and provides a means for the network manager to retrieve them.

Subsequent sections of this disclosure describe in more detail the functions of the Inspector 255, the Local and Virtual Labyrinths 257 and 258, the Cloud Inspector Service (CIS) 262, and the Management Server 263.

Inspector Connections

There are multiple ways for the Inspector to connect to the firewall and other elements in FIG. 2, and to determine which packets have been blocked by the firewall.

Port Mirroring

This approach is shown in FIG. 3A. Inspector 255 may be connected in parallel with the existing firewall 250. Inspector 255 sees some or all incoming traffic on the LAN 210 side of the firewall 250 and outgoing on the WAN 260 side of the firewall. Likewise, Inspector 255 sees some or all incoming traffic on the WAN 260 side of the firewall and outgoing on the LAN 210 side of the firewall. Inspector 255 also has a bidirectional connection to the optional Local Labyrinth 257 and a bidirectional connection to the Internet/WAN 260.

The Inspector connections mentioned above may be accomplished by any of a variety of physical means, as understood in the art. Three examples are:

(1) One or more small external packet switches may be configured to replicate ("mirror") the firewall 250's incoming and outgoing traffic, as will be understood by one familiar with the art.

(2) The existing, prior-art packet switch(es) used to connect the firewall 250 to the corporate network/LAN 210 and/or Internet/WAN 260 can be configured to mirror firewall traffic to/from additional ports that connect to the Inspector, as will be understood by one familiar with the art.

(3) The firewall 250 may be built with additional physical ports that mirror incoming and outgoing traffic.

The Inspector 255 determines what traffic is being blocked by the existing firewall by comparing what's going in on the Internet/WAN 260 side with what's coming out on the corporate/LAN 210 side and vice versa. More details on how this can be done are described later in the section "Delta Engine." Optionally, the Inspector 255 may compare incoming and outgoing packets only for one direction of traffic.

Inspector-Provided Mirroring Ports

The approach shown in FIG. 3B is similar to the approach in FIG. 3A, but the Inspector 255 itself may be built with additional physical ports to replicate incoming and outgoing traffic for the Firewall. In FIG. 3B, each port connection is drawn with two lines to show its full-duplex nature and the direction of traffic flow. This approach has the benefit that the Inspector 255 may be designed and configured to block malicious traffic that the Firewall 250 is not blocking. However, it has the disadvantages that traffic going through the Inspector 255 may be delayed slightly, and the Inspector cannot be added to or removed from the customer's network without temporarily disrupting network operations. However, where such slight delay or momentary disruption are acceptable the approach of FIG. 3B may advantageously be used.

Rules Emulation

Figure 3C:
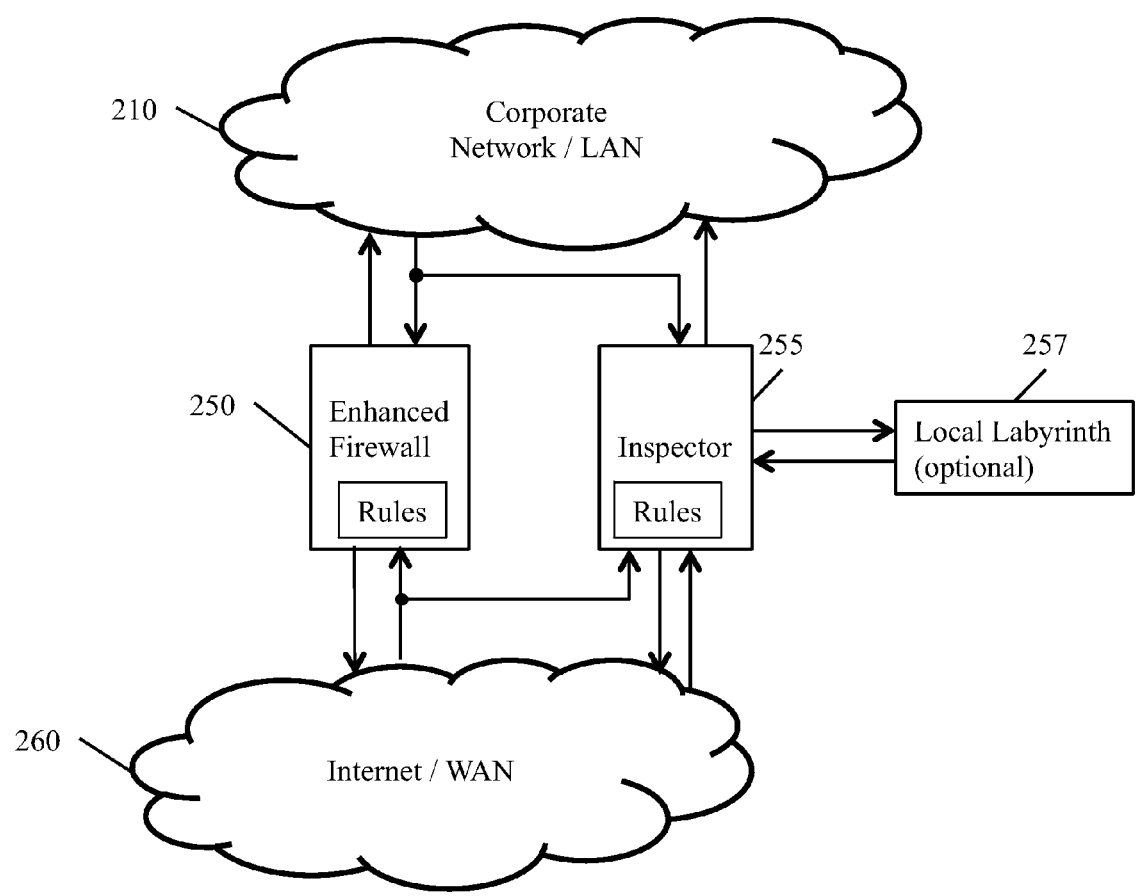

In the approach shown in FIG. 3C, the Inspector does not compare the firewall 250's incoming and outgoing traffic as in FIGS. 3A and 3B. Only the firewall's incoming traffic needs to be delivered to the Inspector by port mirroring or other means.

A firewall 250 has a set of rules that it uses to block traffic that would otherwise pass through it, from the Internet/WAN 260 to the corporate network/LAN 210 and vice versa. In FIG. 3C, a copy of the firewall 250's set of rules is made accessible to the Inspector 255, which sees all of the traffic going into the firewall on both sides. Using the firewall's rules, the Inspector emulates the decisions of the firewall by applying the rules to incoming traffic and determining which traffic the firewall is blocking, and which traffic it is allowing to pass through.

Disadvantages of this approach include that the quality of the Inspector's results depends on how well it emulates the firewall. This may be difficult to achieve, especially assuming that the firewall is made by a third party who does not provide access to their internal algorithms. Moreover, for accurate results the Inspector would need to be "bug-for-bug compatible" with the firewall. Additionally, the Inspector's rule-processing algorithms would potentially have to be updated every time the firewall software was updated. And a successful commercial product would have to do this for multiple different vendors and models of firewalls. Finally, the rule set accessed by the Inspector would have to be updated every time the firewall's rule set is updated, which can be quite frequent (daily or more as new threats appear) in active networks. However, where such information is available the use of rule emulation by the Inspector 255 may be advantageously used.

Enhanced Firewall

In the approach shown in FIG. 3D, the Inspector again does not compare the firewall 250's incoming and outgoing traffic as in FIGS. 3A and 3B. In this Figure, the firewall is enhanced with Blocked-Traffic Port 251 that connects directly to the Inspector 255. The enhanced Firewall 250 automatically forwards all blocked incoming traffic from Internet/WAN 260 and the Corporate Network 210 to the Inspector 255 using the Blocked-Traffic Port 251.

In some embodiments, there may be two Blocked-Traffic Ports 251 and two links between the enhanced Firewall 250 and the Inspector 255, with one link carrying blocked traffic that came into the Firewall on the LAN 210 side, and the other carrying blocked traffic that came into the Firewall on the WAN 260 side.

In some embodiments, traffic from the enhanced Firewall 250 to the Inspector may be tagged or encapsulated to supply related information to the Inspector 255. For example, in addition to containing the original packet, a tagged or encapsulated packet may also specify the origin of the packet (LAN 210 or WAN 260 side) and the enhanced Firewall 250 rule or rules that caused the packet to be blocked.

In some embodiments, the Firewall 250 may not deliver the entire contents of blocked packets to the Inspector 255. As discussed later in this disclosure, the Inspector 255 may analyze only a blocked packet's header, not its entire contents. If the Inspector 255 has determined that traffic from a given session (defined later) is going to be dropped entirely, then the Firewall need not deliver any traffic from that session on the Blocked-Traffic Port 251. However, if the Inspector wishes to forward a session's blocked traffic to the Labyrinth 257 or 258, then it may, of course, receive complete copies of blocked packets from the Blocked-Traffic Port 251. The Inspector 255 may communicate with the enhanced Firewall 250 to communicate how the traffic in each session is to be forwarded on the Blocked-Traffic Port 251, for example, in its entirety, only headers, or not at all.

In some embodiments, the Inspector 255 may wish to send traffic to the Corporate Network/LAN 210 and to the Internet/WAN 260. Such traffic may be associated with a Labyrinth 257 or 258, the Cloud Inspector Service (CIS) 262, or the Management Server 263. The Inspector 255 may send such traffic through the enhanced Firewall 250 to the Corporate Network/LAN 210 and to the Internet/WAN 260 through the Dropped-Packet Port 251 using the link or links described above. The Inspector 255 may tag or encapsulate such traffic to supply related information. Especially in the case where there is only a single link between the enhanced Firewall and the Inspector, a tagged or encapsulated packet may specify the destination of the packet (Corporate Network/LAN 210 or Internet/WAN 260).

Integrated Firewall and Inspector

Figure 3D:
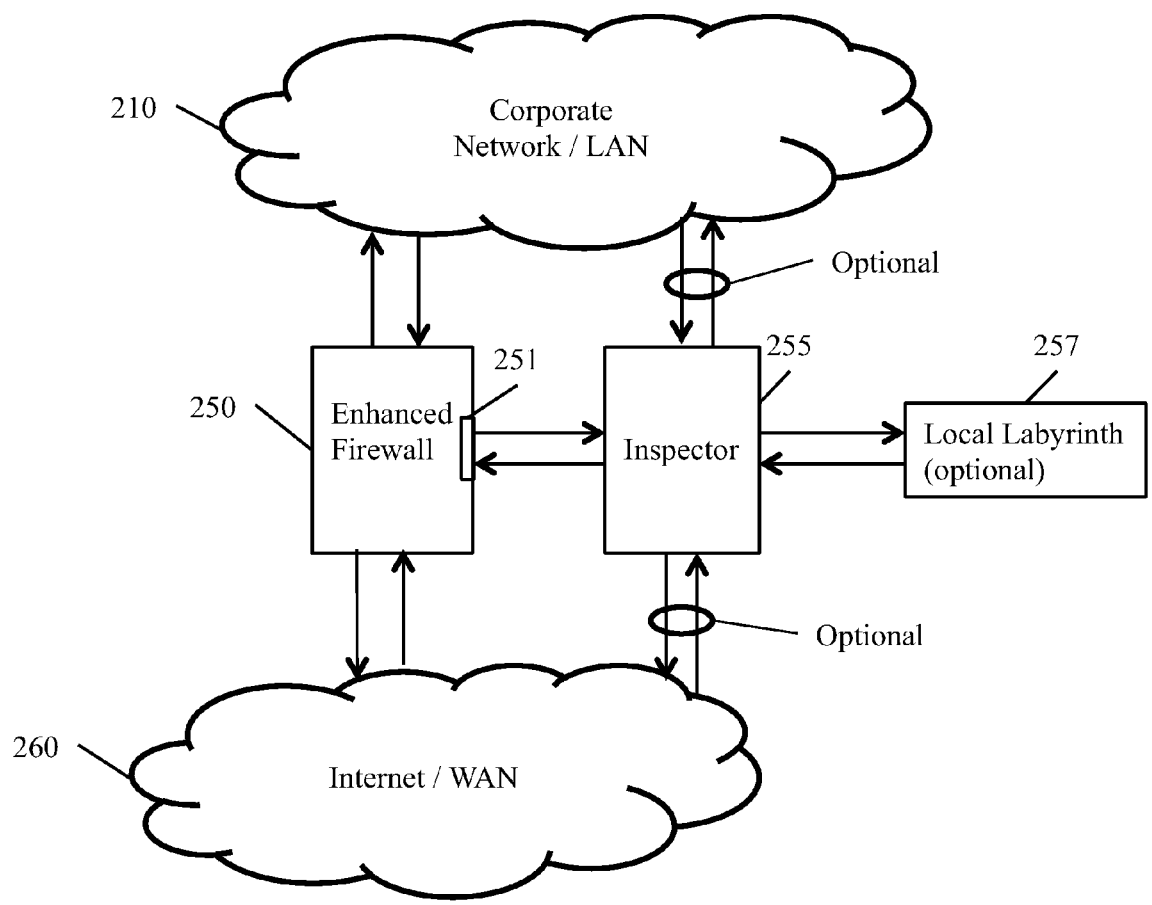
Figure 3E:
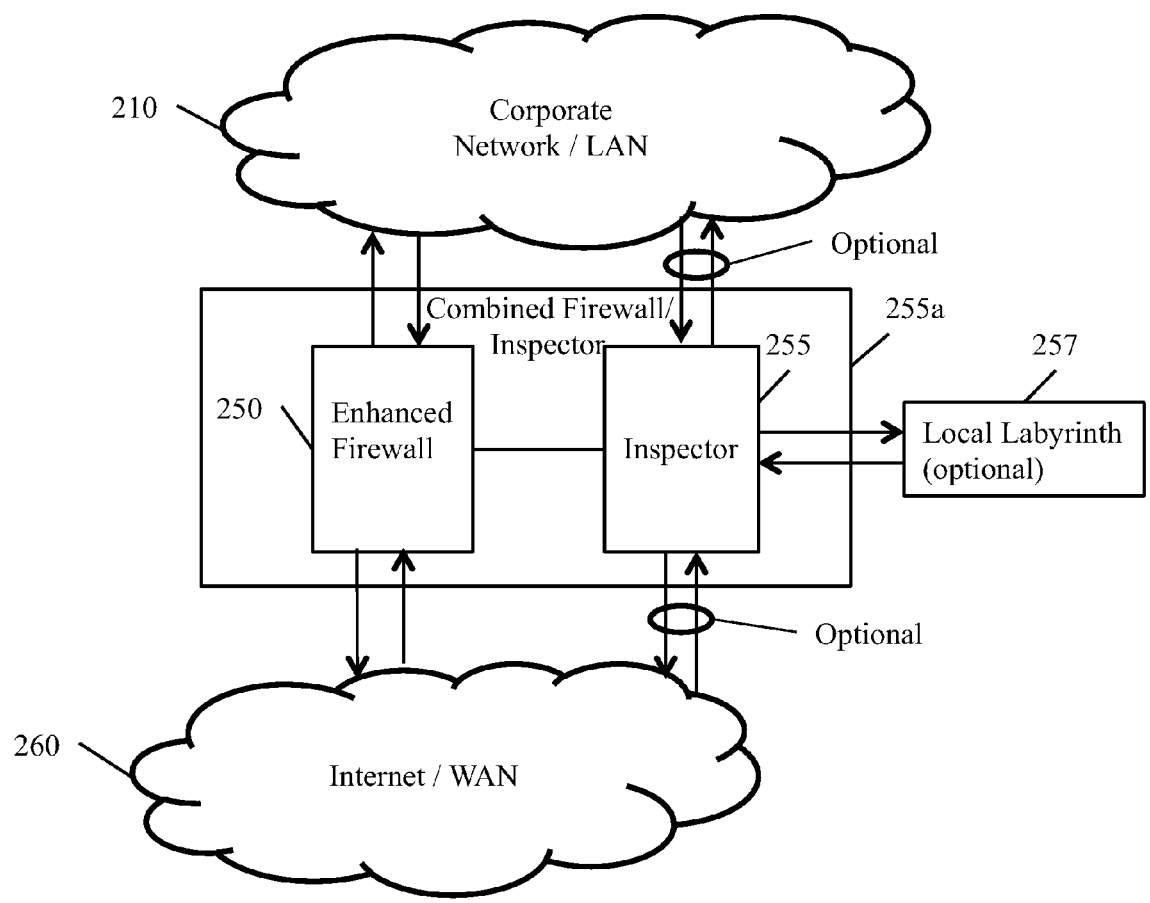

The approach shown in FIG. 3E is similar to that of FIG. 3D, except that the enhanced Firewall 250 and the Inspector 255 are combined into a single device 255a. In this case, the communication between the enhanced Firewall 250 and the Inspector 255 occurs internally, and therefore need not use a traditional network link. Instead, communication may take place using any of a variety of information-sharing methods understood in the art, including buses, FIFOs, internal high-speed serial links, and various data structures in shared memory.

In one embodiment, the Enhanced Firewall 250 and the Inspector 255 each operate using its own dedicated processor, multiprocessor, network processor, and/or hardware assists. Given the ease of local communication in this environment, it is also possible for the enhanced Firewall and the Inspector to share resources. Indeed, in the case of supporting very low bandwidth connections to the Corporate Network/LAN 210 and the Internet/WAN 260 (for example, 1 Megabit/sec), it could be possible to perform all of the functions of the enhanced Firewall 250 and the Inspector 255 using a single high-performance microprocessor with appropriately structured software processes and no hardware assistance.

In some embodiments of FIGS. 3A through 3E, the Inspector 255 may have additional ports and links to connect it directly to the Corporate Network/LAN 210 and/or the Internet/WAN 260, to carry traffic associated with a Labyrinth 257 or 258, the Cloud Inspector Service (CIS) 262, or the Management Server 263. An advantage of this approach is that it does not increase the traffic on or stress the Firewall's connections to the Corporate Network/LAN 210 and to the Internet/WAN 260, and these additional ports and links can be managed independently.

Inspector Modules

Figure 4A:
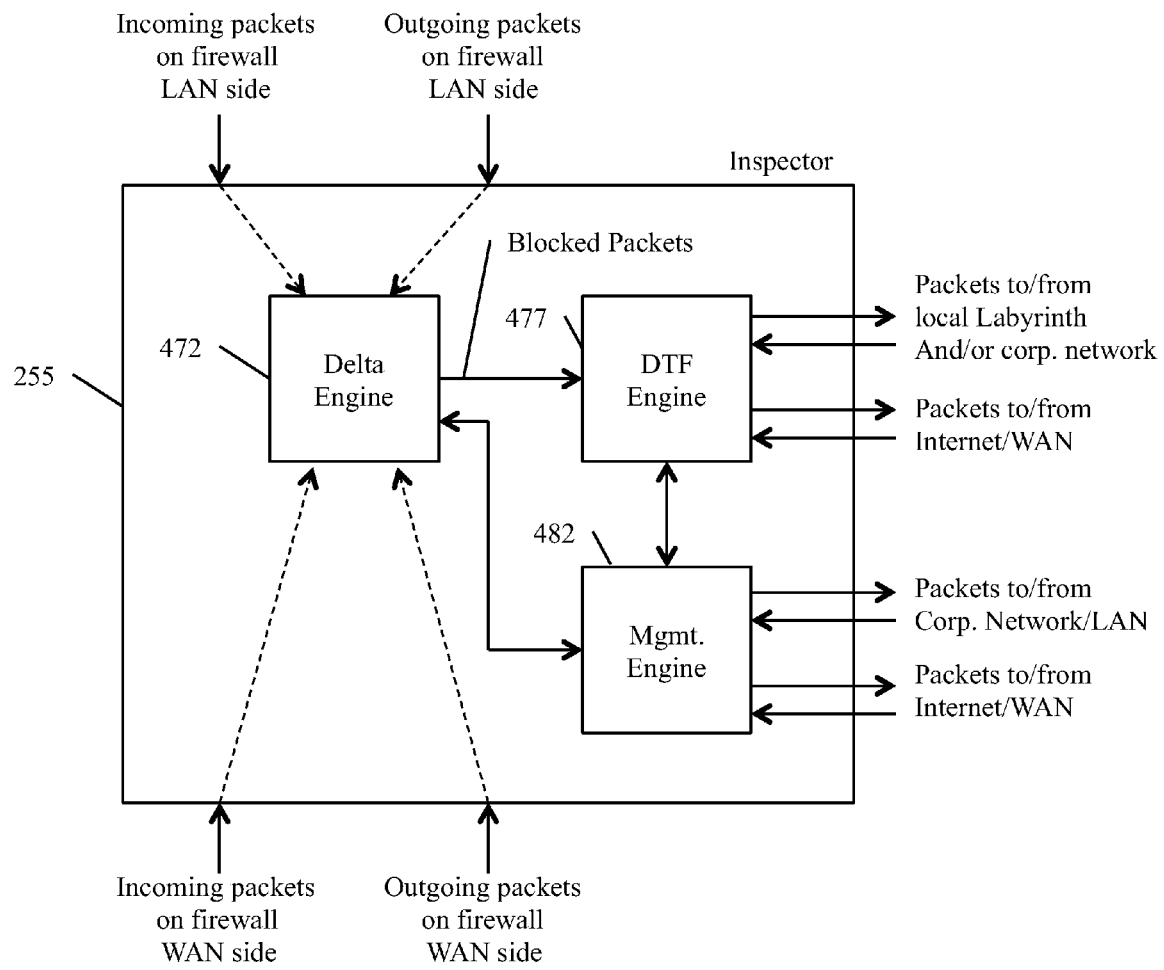
FIGS. 4A through 4C are schematic diagrams of an inspector in accordance with an embodiment of the present invention.

FIG. 4A is a block diagram of an Inspector 255 that is appropriate for use with the configurations of FIGS. 3A and 3B, including its logical connections to the Firewall 250, the Corporate Network/LAN 210, and the Internet/WAN 260. As described previously, the physical connections may be provided through one or more physical ports depending on the physical configuration of the Inspector 255 and the location of the of the other devices in the LAN 210 or Internet/WAN 260. The Inspector 255 communicates with the Labyrinth 257 or 258, the Cloud Inspector Service (CIS) 262, and the Management Server 263 via the LAN 210 and the Internet/WAN 260.

The primary modules in the Inspector 255 in FIG. 4A include a Delta Engine 472, a Decision, Telemetry, and Forwarding (DTF) Engine 477, and a Management Engine 482.

A function of the Delta Engine 472 is to determine which packets have been blocked by the Firewall 250, as described in the next section, and to make these packets available for further processing by the DTF Engine 477.

A function of the DTF Engine 477 is to decide if a blocked packet requires further processing. Such processing may include determining and updating session information associated with the packet, updating statistics (telemetry) associated with the packet, and forwarding the packet to the Labyrinth 257 or 258 for further processing and engagement of the attacker. The DTF Engine 477 has logical connections to the LAN 210 and/or WAN 260 for communicating with the Labyrinth 257 or 258 and with attackers located in the LAN 210 or WAN 260.

A primary function of the Management Engine 482 is to communicate with the Cloud Inspector Service (CIS) 262. The DTF Engine 477 maintains statistics (telemetry) related to attacks, and the Management Engine 482 periodically sends this telemetry information to the CIS 262 for further analysis and correlation. The CIS 262 may also periodically send information in the reverse direction, which the Management Engine 482 may provide to the DTF Engine 477 to enhance its operation. For example, such information could include blacklists of IP addresses that are known to be malicious by other entities in the network, but are unknown to the Firewall 250. A secondary function of the Management Engine is to support configuration of the Inspector 255 through a local console or a remote Management Server 263. Some or all of the DTF engine 477, CIS 262, and management engine 482 may be viewed as central modules that make decisions and issue instructions based on information gathered by the Inspectors 255 and based on one or more configuration parameters or other external information.

Figure 4B:
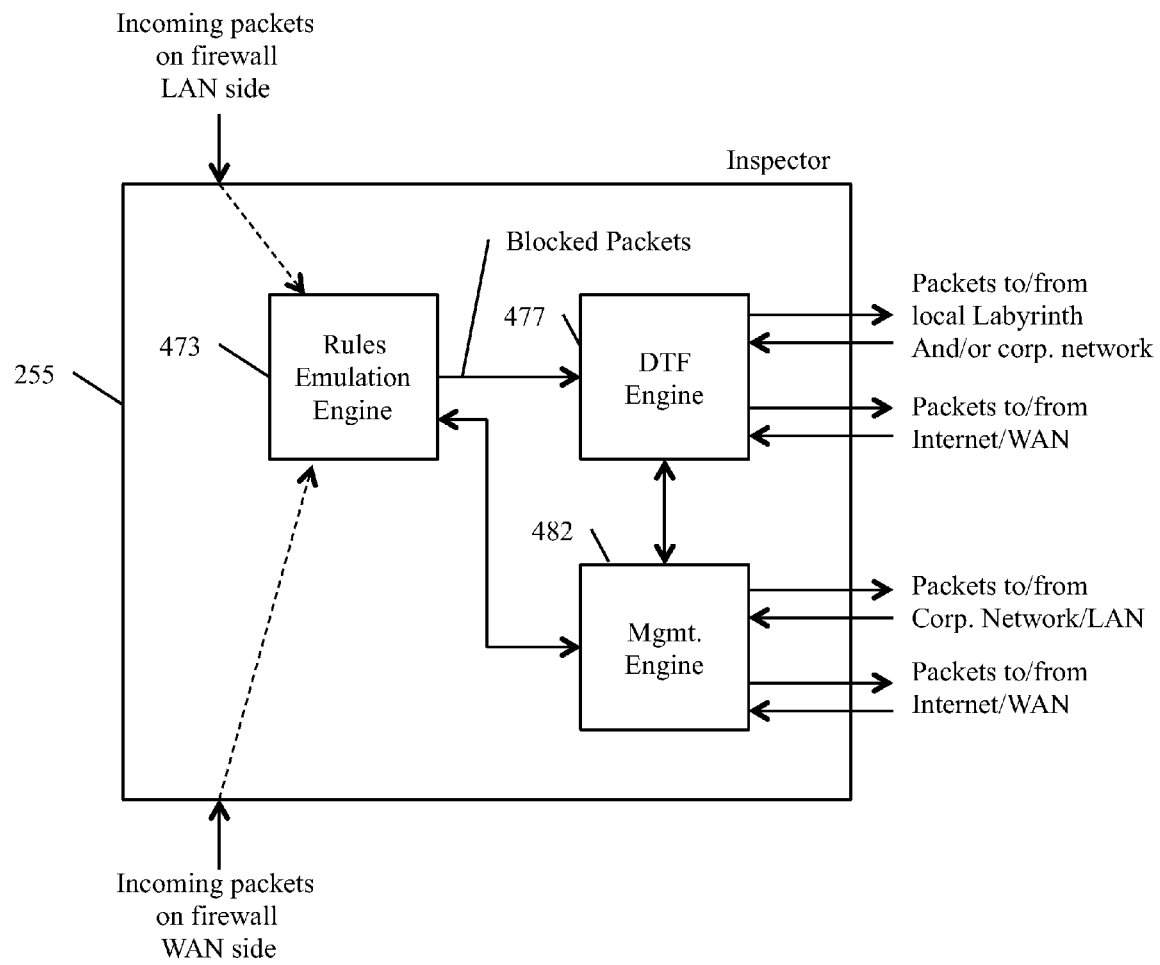

FIG. 4B is a block diagram of an Inspector 255 that is appropriate for use with the configuration of FIG. 3C. Its operation is very similar to FIG. 4A, except instead of a Delta Engine 472, it has a Rules Emulation Engine 473 which determines which packets have been blocked by the Firewall 250.

Figure 4C:
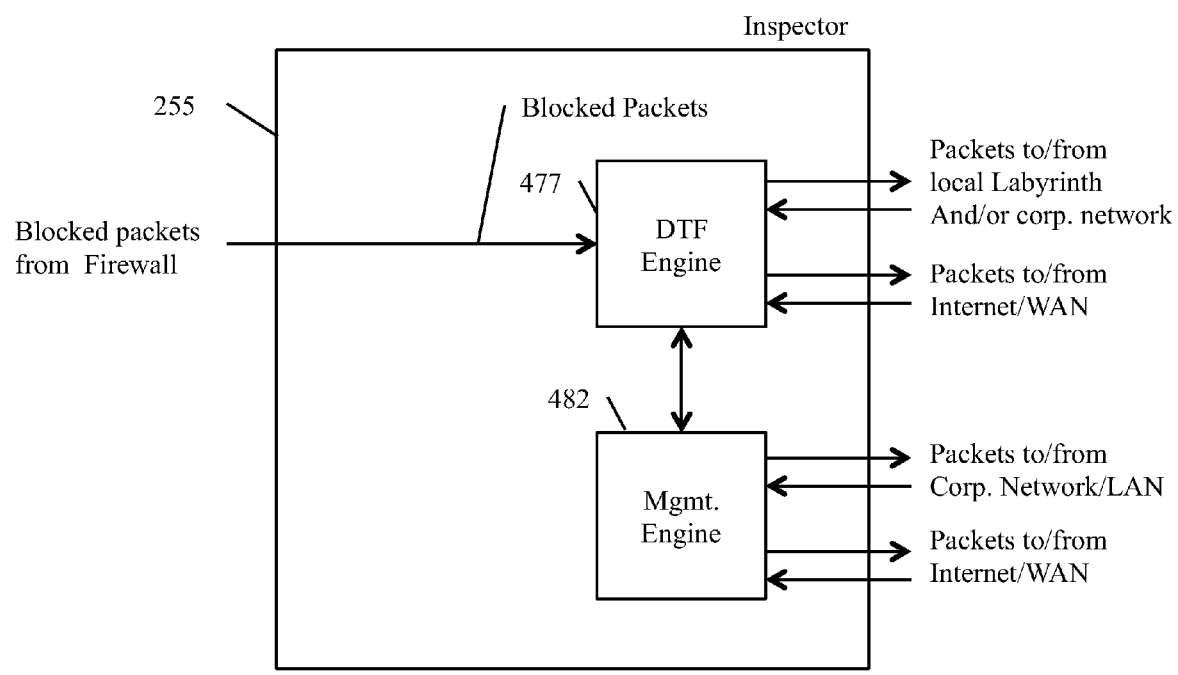

FIG. 4C is a block diagram of an Inspector 255 that is appropriate for use with the configurations of FIGS. 3D and 3E. Again its operation is very similar to FIG. 4A, except it contains no Delta Engine 472. In FIG. 4C, the Firewall 250 provides blocked packets directly to the DTF Engine 477. The enhanced Firewall 250 in FIG. 3D does this by sending blocked packets to the Inspector 255 through the Blocked-Packet Port 251. The integrated Firewall/Inspector 255a in FIG. 3E can do this by any of a number of means, such as copying the blocked packets across a bus or high-speed link, or simply passing a pointer to the blocked packet as it is already stored in a shared memory, as will be understood by one skilled in the art.

Delta Engine

To be used with conventional firewalls, the Inspector 255 may advantageously find out what packets are being blocked by the Firewall 250. In the approaches of FIGS. 3A and 3B, this is accomplished by comparing traffic going into the firewall from the Internet/WAN 260 side with the traffic coming out of it on the corporate network/LAN 210 side, and vice versa.

As mentioned previously, the Inspector 255 in FIG. 4A contains a module called the Delta Engine 472 which compares incoming and outgoing traffic. In this section, the Delta Engine's operation is described for traffic going into the Firewall 250 from the Internet/WAN 260 side and coming out of it on the corporate network/LAN 210 side; operation for the reverse direction is the same with the appropriate role reversals.

In the case that the Firewall 250 is functioning strictly as a firewall and does not perform any additional functions, it examines each packet received on the WAN 260 side, applies configured rules, and either forwards the packet, unmodified, on the LAN 210 side, or blocks it (does not forward it). There are cases where the Firewall 250 may perform additional functions and in doing so may modify packets; these are discussed below.

The Firewall 250 takes time to apply rules, and its other internal operations may cause further unpredictable delays between the time when a packet is received on the WAN 260 side and when it is forwarded on the LAN 210 side; herein, this will be called the transit delay. Different packets in a given stream of packets between a source and destination may experience different transit delays. Independent of transit-delay variability, most firewalls are designed at least to preserve the order of packets in a given stream, that is, packets are forwarded on the LAN 210 side in the same order in which they were received on the WAN 260 side. However, this is not always guaranteed. The Delta Engine 472 may advantageously operate properly with all these cases.

Delta Engine Operation

Figure 5:
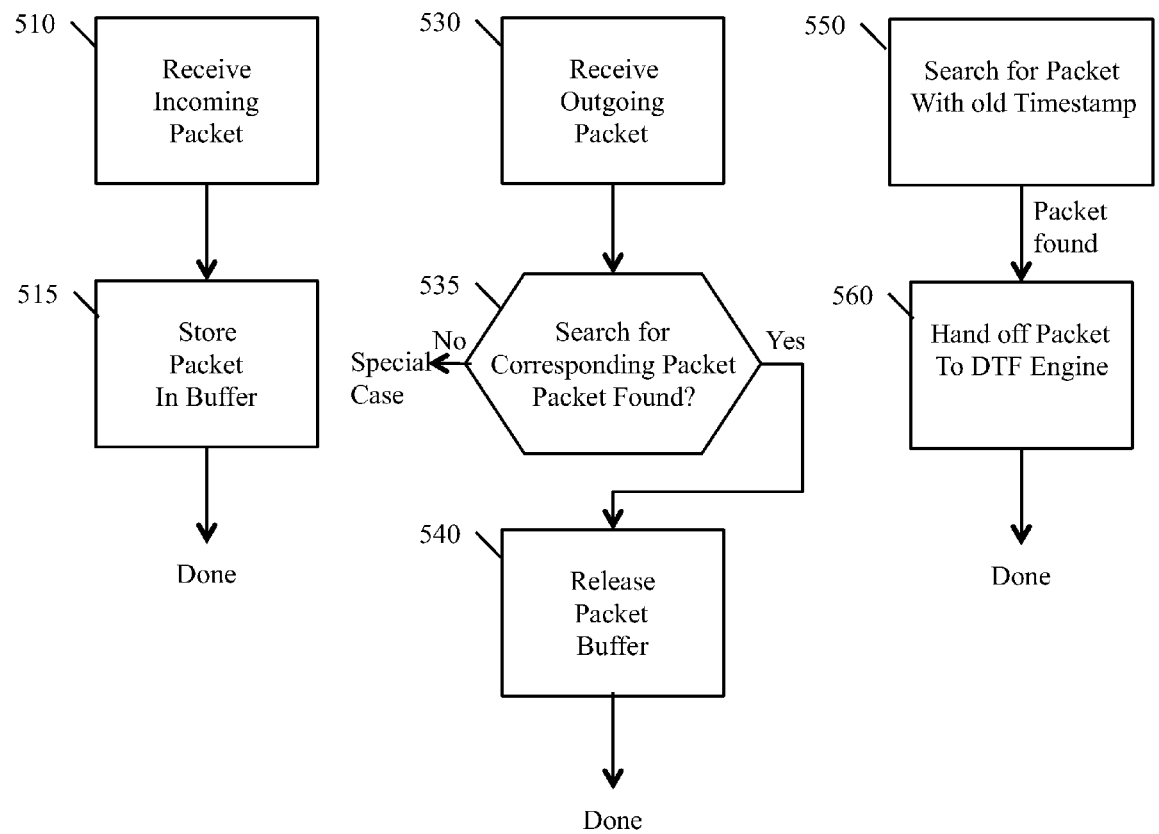
FIG. 5 is a process flow diagram of a method for detecting blocked packets in accordance with an embodiment of the present invention.

FIG. 5 is a flowchart that shows the operation of the Delta Engine 472 for determining if an incoming packet on the WAN 260 side has been dropped by the Firewall 250.

In step 510, the Delta Engine 472 receives a packet that is also entering the Firewall 250 on the WAN 260 side. In step 515 it stores a complete copy of the incoming packet into a packet buffer and a timestamp of when it was received. It stores the complete copy for further processing by the DTF Engine 477 in case the packet is dropped by the Firewall 250.

In step 530, the Delta Engine 472 receives an outgoing packet that has just exited the firewall 250 on the LAN 210 side. In step 535, it searches its packet buffers for a corresponding packet that was received in step 515. The search may use algorithms and data structures as understood by those skilled in the art. The methods and operations used to determine if two packets are "corresponding" are discussed later in this disclosure. If no corresponding packet is found, either this is an error or the packet was generated by the Firewall 250 itself; either way, this is handled as a special case not described here. If the packet is found, operation continues to step 540.

In step 540, the Delta Engine 472 releases the packet buffer in which it stored the packet in step 515, freeing up the packet buffer for use with another received packet.

In step 550, the Delta Engine 472 searches its packet buffers for packets whose timestamps are older than a certain configurable amount, called the maximum transit delay. The timestamps stored in step 515 may be organized using algorithms and data structures to make this search very efficient, as understood by those skilled in the art. A packet whose timestamp is older than the maximum transit delay is assumed to have been blocked by the Firewall 250.

In step 560, the Delta Engine 472 has found a packet whose timestamp is older than the maximum transit delay. It makes this packet available for further processing by the DTF Engine 477 whose operation is described later. As will be understood by one skilled in the art, the hand-off from the Delta Engine 472 to the DTF Engine 477 may occur by any of a variety of means, including actually transmitting or copying the packet, or by merely giving the DTF Engine a pointer to the buffer where the packet is already stored in a shared memory. In the former case, the Delta Engine 472 may release the buffer once the packet has been transmitted or copied.

It will be evident to one skilled in the art that FIG. 5 contains three separate but interacting processes—steps 510 through 515, steps 530 through 540, and steps 550 through 560. As understood by one skilled in the art, such a collection of processes may be performed by one entity or by multiple entities, each of which may be software running on the same processor as other Inspector functions, a special-purpose processor and software, a special-purpose hardware apparatus, or a combination thereof, as dictated by performance, cost and other requirements and trade-offs.

Delta Engine 472 operation for the reverse direction (packets coming in on the LAN 210 side destined to go out on the WAN 260 side) is similar.

Identifying Corresponding Packets

Returning to step 535 in FIG. 5, the Delta Engine 472 may advantageously identify whether a packet that has exited the Firewall 250 on the LAN 210 side corresponds to a packet that was received on the WAN 260 side. There are several ways to do this.

Assuming that the Firewall 250 is not performing any other functions, it does not modify packets in any way and therefore one approach is to compare lengths and do a complete byte-by-byte comparison of incoming and outgoing packets. Almost equivalently, as understood in the art, it would be possible to calculate an MD5 or similar checksum for the incoming and outgoing packets and compare them. However, a byte-by-byte comparison is very expensive, and the checksum calculation is relatively expensive unless performed by hardware assist as the packet arrives. In some embodiments, resources are available to perform such an approach notwithstanding the computational complexity.

A much less expensive alternative is to compare only selected fields in the IP headers of incoming and outgoing packets. Useful fields in IPv4 headers include the source IP address (SrcIP), destination IP address (DstIP), Protocol and, for packets where the Protocol field indicates TCP or UDP, the source port (SrcPort) and destination port (DstPort) in the TCP or UDP header. In IPv6, the Next Header field performs the function of IPv4's Protocol field.

Since most attacks, including those that use web access, FTP, or remote login, are carried out using TCP as the transport protocol, the TCP case is discussed hereinafter, and all packets being processed are assumed to have already been identified as having the Protocol field indicate TCP. The methods disclosed may be adapted to other values of the Protocol field by one skilled in the art.

A good tradeoff between simplicity and accuracy of comparisons is to compare SrcIP, DstIP, SrcPort, and DstPort for equality in the incoming and outgoing packets. Of course, this does not guarantee that the payloads are equal, so it is possible to identify two different packets as being "corresponding". This could happen, for example, if the Firewall 250 sometimes changes the ordering of packets going through it. For greater accuracy, the packet lengths may also be included in the comparison, but this is may not always be possible in cases where the Firewall 250 modifies the packet. The sequence number may also be included in the case of TCP packets In any case, if the Delta Engine 472 mis-identifies packets having different payloads but the same SrcIP, DstIP, SrcPort, and DstPort values as being "corresponding," in all likelihood no harm is done. Consider a pair of incoming packets which are swapped in identification. If neither is blocked by the Firewall 250, in step 540 of FIG. 5 the Delta Engine 472 will eventually release both buffers in which the incoming packets were received; so no harm is done. If both are blocked, then both will be handed off to the DTF Engine 477 in step 560.

Still, it is possible that the Firewall 250 may not block the first packet in the stream from an attacker, and based on evidence of malice in subsequent packets decide to block some or all of the subsequent packets in the stream. In this case, depending on packet ordering and the Delta Engine 472's search algorithm, it is possible that a subsequent malicious, blocked packet will be matched and its buffer released in steps 535 and 540, while the first, unblocked, non-malicious packet is handed off to the DTF Engine 477 in step 560, including the DTF Engine 577 possibly forwarding it to the Labyrinth 257 or 258 for engaging the attacker. Note that the same packet has also been forwarded by the Firewall 250 to its real destination. Although this anomaly most likely will not result in an effective engagement by the Labyrinth with the attacker, it is likely to produce enough disruption that the attacker will move on. Also, if the whitelist/blacklist approach described later is used, eventually all traffic by the attacker would be potentially forwarded to the Labyrinth, leaving open the possibility of an effective engagement.

Additional heuristics, not disclosed here, may be applied to strengthen the validity of comparisons for "corresponding" packets For example, using an assumption that the firewall 250 does not re-order packets, comparisons could be aided by detecting "gaps" (missing packets) in the outgoing packet stream as compared to the incoming packet stream.

Network Address Translation (NAT)

Network Address Translation (NAT) allows communication between entities in a corporate network/LAN 210 which has private IP addresses which may be reused in other private networks, and entities in the Internet/WAN 260 which have globally unique, public IP addresses. Although NAT is not inherently a firewall function, most commercial firewalls have evolved to provide NAT as an additional function, in part because of their position at the edge of the corporate network and because of the types of processing facilities they already have for the firewall function.

NAT modifies the IP and TCP headers of packets, and advanced application-layer-aware NAT may even modify some payloads. Thus, NAT may advantageously be considered in the design of the Delta Engine 472 if it is to be used with a Firewall 250 that incorporates NAT functions. Two typical uses of NAT are considered below.

The first use is a static NAT function, in which the private IP address of a corporate entity such as a server inside the corporate network/WAN 210 is statically mapped to a public IP address which is known to entities outside the LAN 210. This allows communication with the corporate entity to be initiated by devices in the Internet/WAN 260. In this case, the NAT function (in this case residing in the Firewall 250) receives a packet from the WAN 260 having the corporate server's public IP address in the DstIP field. Using statically configured information, the NAT function recognizes this address and replaces it with the corporate server's private IP address before forwarding the packet to the LAN 210. In some cases, it may similarly translate the DstPort field to a different value. In some embodiments, the Delta Engine 472 in the Inspector 255 is not aware of that translation of DstIP and possibly DstPort have occurred.

In the reverse direction, the NAT function receives a packet from the LAN 210 having the corporate server's private IP address in the SrcIP field. Using the same statically configured information, the NAT function recognizes this address and replaces it with the corporate server's public IP address before forwarding the packet to the WAN 260. In some cases, it may similarly translate the SrcPort field to a different value. Once again in some embodiments, the Delta Engine 472 in the Inspector 255 is not aware of that translation of SrcIP and possibly SrcPort have occurred.

Thus, in the comparison of incoming and outgoing packets described previously (SrcIP, DstIP, SrcPort, and DstPort are all checked for equality), the translated outgoing packets in either direction will not be found to "correspond" with the incoming packets, and will be assumed to have been blocked by the Firewall 250, causing erroneous operation of the Inspector (a false positive, where an incoming packet may be forwarded to both the LAN 210 and to the Labyrinth 257 or 258 via the DTF Engine 477 which is solved by [103] section below).

For the first direction, traffic from the WAN 260 to the LAN 210, a solution to this problem is for the Delta Engine 472 to omit DstIP and DstPort in the comparison of incoming and outgoing packets, that is, for it to compare only the SrcIP and SrcPort fields. For the second direction, traffic from the LAN 210 to the WAN 260, a solution is for the Delta Engine 472 to omit SrcIP and SrcPort in the comparison of incoming and outgoing packets, that is, for it to compare only the DstIP and DstPort fields.

The solutions described above prevent false positives but may weaken the validity of comparisons for "corresponding" packets. Consider the following scenario for the WAN-to-LAN direction. An attacker in the Internet/WAN 260 may simultaneously initiate two separate sessions or streams of communication with two different servers in the corporate LAN 210, where the first session is innocuous but the second is malicious. Normally, the SrcPort numbers in the two sessions would be different, allowing the DTF Engine 477 to correctly distinguish the sessions and make the correct correspondences between incoming and outgoing packets.

However, the attacker may instead use the same SrcPort numbers in both sessions. The Firewall 250 may properly allow the innocuous stream to pass though, while blocking the malicious stream. Using the flowchart steps in FIG. 5, the Delta Engine 472 will match each outgoing packet containing the attacker's SrcIP to an incoming packet with the same SrcIP, but the matched packets could come from either stream. Thus, at the expiration of the maximum transit delay, the remaining buffered packets, which are assumed to have been dropped by the firewall, may actually be a partial collection of packets from both streams, and may be forwarded to the Labyrinth 257 or 258 via the DTF Engine 477. Unfortunately, the fact that the forwarded stream may be missing packets from the original incoming malicious stream may prevent the Labyrinth from properly engaging the attacker. This drawback can be avoided using the "whitelist" approach described later, by adding certain information to whitelist entries as they are created.

A second use of NAT is a dynamic NAT function, used when entities inside the corporate network/LAN 210 wish to communicate with entities in the Internet/WAN 260 having known, globally unique IP addresses. In this case, as is understood in the art, the NAT function (again residing in the Firewall 250) receives a packet from the LAN 210 having the corporate entity's private IP address in the SrcIP field and a typically randomly selected number in the SrcPort field identifying the session. The DstIP and DstPort fields in this LAN-to-WAN packet contain the publicly known address and port for the targeted entity in the WAN 260. The NAT function replaces the original private IP address with a public one from a small pool of public IP addresses allocated to it, and replaces the original SrcPort number with one that is not being used by any other entity that is "masquerading" using the same public IP address.

The NAT function maintains stateful information to ensure that subsequent incoming LAN-to-WAN packets on the LAN 210 side with the same original SrcIP/SrcPort pair will have that field translated to the same SrcIP/SrcPort pair that was selected for the first packet. Also, when the NAT function receives subsequent incoming WAN-to-LAN packets on the WAN 260 side that have the same IP address and port number pair in the DstIP and DstPort fields, it will translate these fields to the original, private SrcIP/SrcPort pair before forwarding to the LAN 210, as is understood in the art.

As in the first use case, in some embodiments, the Delta Engine 472 in the Inspector 255 is not aware of that translation of DstIP and DstPort have occurred in the WAN-to-LAN direction, nor that translation of SrcIP and SrcPort have occurred in the LAN-to-WAN direction. Once again, if the comparison of incoming and outgoing packets includes all of SrcIP, DstIP, SrcPort, and DstPort, a translated outgoing packet will not be found to "correspond" with the incoming packet, and will again be assumed to have been blocked by the Firewall 250, causing erroneous operation, a false positive.

A solution to this problem is the same as in the first use case. For one direction, traffic from the WAN 260 to the LAN 210 the Delta Engine 472 omits DstIP and DstPort in the comparison of incoming and outgoing packets; it compares only the SrcIP and SrcPort fields. For the other direction, traffic from the LAN 210 to the WAN 260, the Delta Engine 472 omits SrcIP and SrcPort in the comparison of incoming and outgoing packets; it compares only the DstIP and DstPort fields.

Configuring Maximum Transit Delay

Returning to step 550 in FIG. 5, it may be beneficial to configure the maximum transit delay properly. The actual transit delay across a firewall may vary depending on conditions in the network, other tasks being performed by the firewall, and of course by the design of the firewall itself. If the maximum transit delay is configured to be too low, then the Delta Engine 472 will mistakenly identify packets experiencing "slow transit" as having been blocked and it may send them to the Labyrinth 257 or 258 to engage the mis-identified attacker. In this case, the originator of a slow-transit packet will receive two responses, probably much different, which can be very confusing and disruptive to the originator's operations. This is a "false positive" and may preferably be avoided.

The maximum transit delay can be configured in a variety of ways. One way is to set it to a fixed value at the time of the Inspector 255's manufacture. A second way is to make it configurable in the field, for example using the Management Server 263. This is risky, in that it could be set improperly. Setting too long a maximum transit delay requires the Delta Engine 472 to retain received packets longer, and thus requires more storage for packet buffers. Further, taking longer to decide that an incoming packet has been blocked correspondingly increases the time to forward the packet to the Labyrinth 257 or 258 and delays the engagement with the attacker, which the attacker may notice.

A third way of setting the maximum transit delay is to do so automatically and dynamically. It is possible for the Delta Engine 472 to keep track of the longest transit delay that has actually been experienced over a period of time. In step 530 of FIG. 5, the Delta Engine 472 is processing a packet that has exited the Firewall 250. This step may be enhanced so that the packet's actual transit delay is computed using its time of arrival at the Delta Engine and the timestamp for the corresponding incoming packet that was stored in step 515. The actual transit delay is compared with a stored number giving the longest transit delay experienced thus far, and the stored number is replaced with the newly computed actual transit delay if it is longer. The maximum transit delay is then set to be the new longest transit delay, plus a safety margin.

The safety margin could be set in any of a variety of ways; for example, it could be a fixed amount (e.g., 100 msec), or a fraction of the longest transit delay (e.g., 0.5 times the longest transit delay). The automatic calculation could be further enhanced to keep track of additional information, such as the shortest actual transit delay, the statistics of the actual transit delay (such as mean and standard deviation), and the length of time over which transit delay has been observed, and could use these numbers to further guide the safety margin in the maximum transit delay setting. The calculation could also include reducing the maximum transit delay if a previous longest transit delay has not been seen again for a long time.

Decision, Telemetry, and Forwarding (DTF) Engine

The DTF Engine 477 in FIG. 4 receives packets that have been blocked by the Firewall 250. A function of the DTF Engine 477 is to decide if a blocked packet requires further processing. Such processing may include determining and updating session information associated with the packet, updating statistics (telemetry) associated with the packet, and forwarding the packet to the Labyrinth 257 or 258 for further processing and engagement with the attacker. The DTF Engine 477 has logical connections to the LAN 210 and/or WAN 260 for communicating with the Labyrinth 257 or 258 and with attackers located in the LAN 210 or WAN 260.

DTF-Engine Basic Operation

Figure 6:
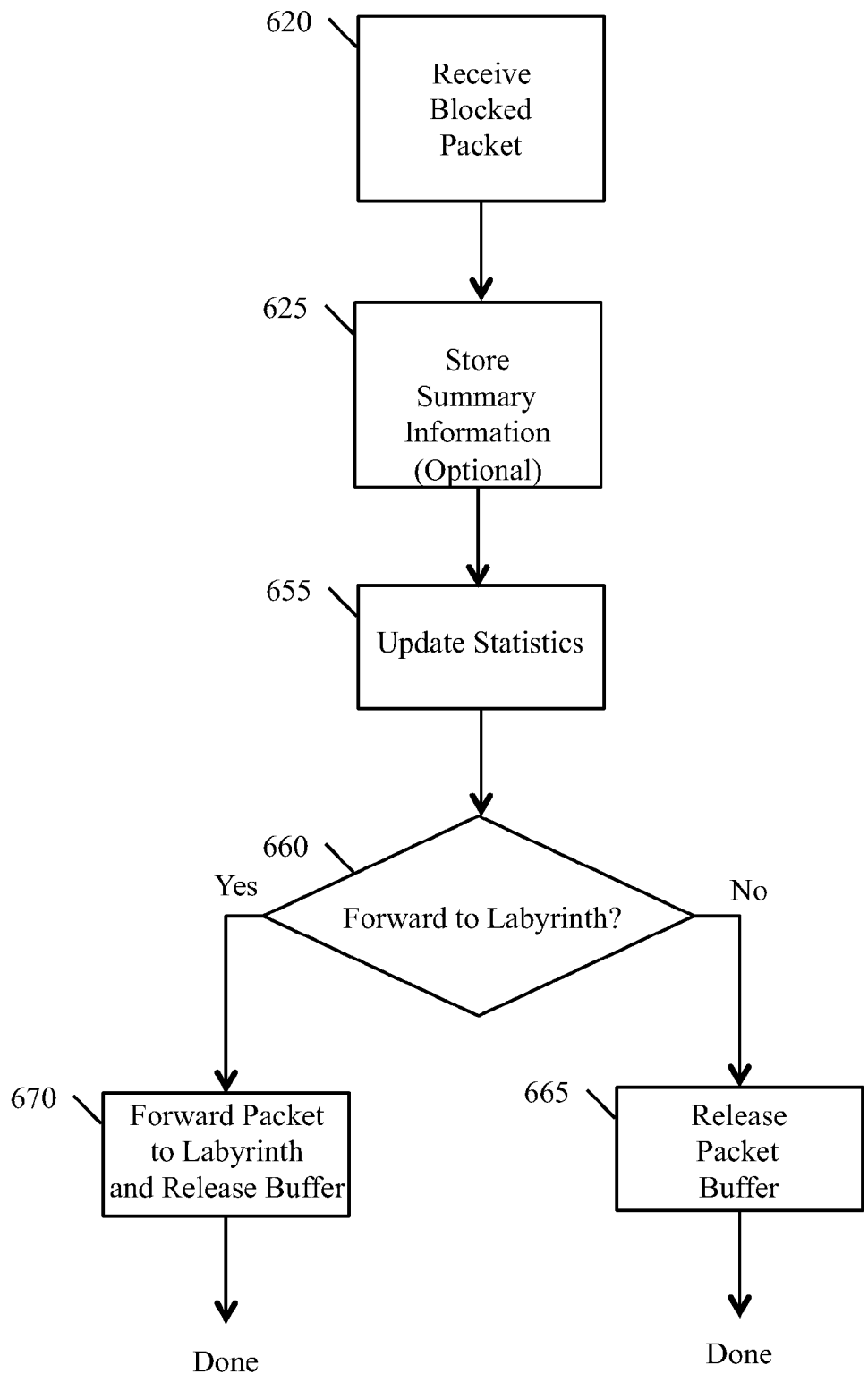
FIG. 6 is a process flow diagram of a method for identifying packets for forwarding to a labyrinth in accordance with an embodiment of the present invention.

FIG. 6 is a flowchart of steps performed by the DTF Engine 477. The first step is to receive or access a blocked packet in Step 620. The next, optional step 625 is to record certain summary information about the packet such as IP addresses, protocol, and port for attack profiling and other telemetry purposes. Such summary information may include one or more of the following:

- packet ingress point (e.g., LAN side or WAN side)
- source IP address
- source IP port
- destination IP address
- destination IP port
- protocol
- packet length
- MD5 126-bit hash, SHA-1 160-bit hash, or other checksum of the complete packet or a subset thereof (such as the IP header) for identifying the packet
- timestamp (possibly copied from the Delta Engine 472's step 515)
- firewall rule(s) used to block packet (if available)

In step 655, the DTF Engine 477 updates statistics associated with a blocked packet. It may gather needed information directly from the blocked packet or it may use summary information stored in step 625. The statistics may be subsequently gathered and/or synopsized by the Management Engine 482 as telemetry information to be sent to the CIS 262.

Since conventional firewalls typically record information about blocked packets, at least counting blocked packets, the user of the Inspector 255 may configure it not to collect certain information and may instead rely on the Firewall 250 to provide such information. Or the user may compare similar statistics gathered by both the Firewall 250 and the Inspector 255 to detect abnormal operations.

In step 660, the DTF Engine 477 determines whether the blocked packet should be forwarded to the Labyrinth 257 or 258 to engage the attacker. To make this determination, it may refer to the copy of the packet that was received or accessed in step 620 as well as the optional summary information saved in step 625. It may also refer to additional information and summaries that the Inspector 255 has created over the course of time, as well as information and summaries provided by outside entities such as the Cloud Inspection Service. Further details on how the determination is made are beyond the scope of the present disclosure.

If the DTF Engine 477 determines in step 660 not to forward the packet to Labyrinth 257 or 258, then it continues to step 665 where it releases the packet buffer immediately.

Otherwise, it continues to step 670 where it forwards the packet to Labyrinth 257 or 258 and releases the packet buffer after forwarding.

Delta-Engine and DTF-Engine Operation with Whitelist and Blacklist

The Delta Engine 472 and the DTF Engine 477 can cooperate to enhance their combined. operational efficiency, as well as to enhance the ability of the Inspector 255 and related elements to detect and engage attackers. This requires certain additional state information to be maintained as described here. This discussion assumes that the Delta Engine 472 uses the packet-comparison methods described previously in connection with NAT.

The operation of the Inspector 255 is such that a communication session between a first entity in the Internet/WAN 260 and a second entity in the corporate network/LAN 210 may be identified by unique (or probably unique) information in the IP headers of packets transmitted and received in the session. For TCP sessions, which constitute the majority of network communications including attacks, the combination of SrcIP, SrcPort, DstIP, and DstPort uniquely identifies a session. As discussed previously in connection with NAT, session identification is also generally possible with only the source or the destination IP/Port pair, depending on the direction of traffic, LAN-to-WAN or WAN-to-LAN.

When the Firewall 250 examines traffic traversing it, it generally does so on a per-session basis. Once it decides that a given session is harmful, it generally blocks all further packets associated with that session. This decision may be made immediately when the session is initiated based on addresses, protocols, and other packet contents; it may be made as the session progresses based on information gleaned during the session (e.g., from "deep packet inspection"); or it may be made based on correlation with other sessions (e.g., with suspicious activity crossing a certain threshold).

Thus, the Inspector 255 can maintain information that records the firewall's decisions for individual sessions. A "blacklist" identifies sessions that the firewall has decided to block. A "whitelist" identifies sessions that the firewall has decided not to block, at least for the moment. A "pending list" keeps track of sessions which have not yet been assigned to the blacklist or the whitelist.

Figure 7:
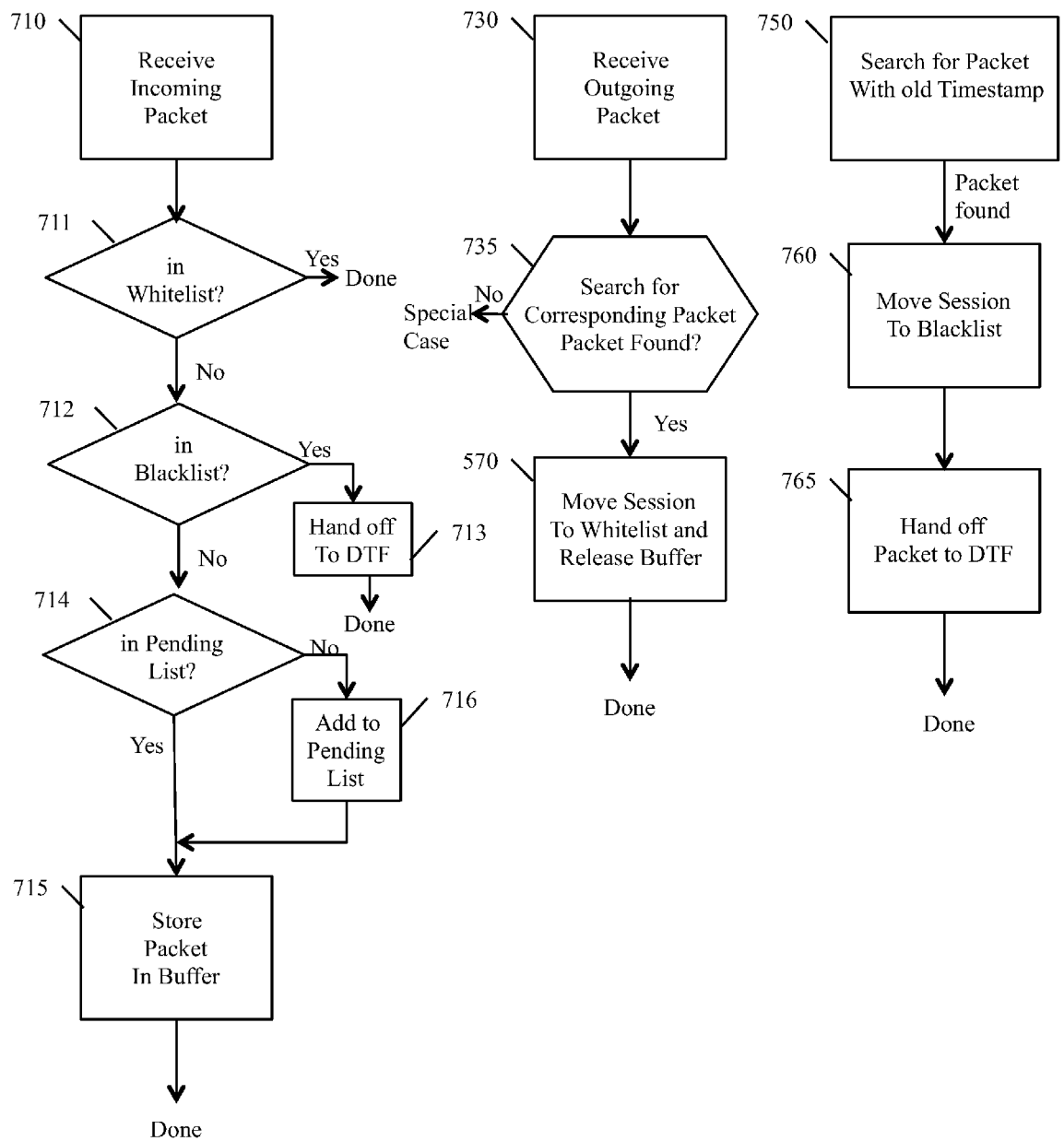
FIG. 7 is a process flow diagram of a method for using a blacklist and whitelist to identify packets for forwarding to central module in accordance with an embodiment of the present invention.

FIG. 7 is a flowchart that shows the operation of a Delta Engine 472 that is cooperating with a DTF Engine 477 for determining if an incoming packet from the WAN 260 side has been dropped by the Firewall 250, using a pending list, a whitelist, and a blacklist.

In step 710, the Delta Engine 472 receives a packet that is also entering the Firewall 250 on the WAN 260 side. In step 711, it examines the packet header for session-identifying information, and if the session is in the whitelist, no further action is taken. Otherwise, in step 712, the packet is checked to see if it is in the blacklist; if so, then in step 713 the packet is made available to the DTF Engine 477 for possible further processing. Otherwise, in steps 714 and 716 the identified session is added to the pending list if it is not already on it. Then, in step 715 the Delta Engine 472 saves a complete copy of the incoming packet into a packet buffer and a timestamp of when it was received.

In step 730, the Delta Engine 472 receives an outgoing packet that has just exited the firewall 250 on the LAN 210 side. In step 735, it searches its pending list for a corresponding packet that was stored in step 715. If no corresponding packet is found, either this is an error or the packet was generated by the Firewall 250 itself; either way, this is handled as a special case not described here. For more robust operation, optional additional processing may be performed in step 735. For example, if the packet's session is found on the blacklist, then the Firewall 250 or the Inspector 255 may have made an error and this is handled as a special case.

If the packet is found on the pending list, the Firewall 250 has allowed the packet to pass through it, and operation continues to step 740. In step 740, the Delta Engine 472 moves the packet's session from the pending list to the whitelist, and releases the packet buffer in which it stored the packet in step 715.

In step 750, the Delta Engine 472 searches its packet buffers for packets whose timestamps are older than the maximum transit delay. A packet whose timestamp is older than the maximum transit delay is assumed to have been blocked by the Firewall 250, and operation continues to step 760.

In step 760, the Delta Engine 472 moves the blocked packet's session from the pending list to the blacklist. In step 765, it makes the packet available for further processing by the DTF Engine 477.

Figure 8:
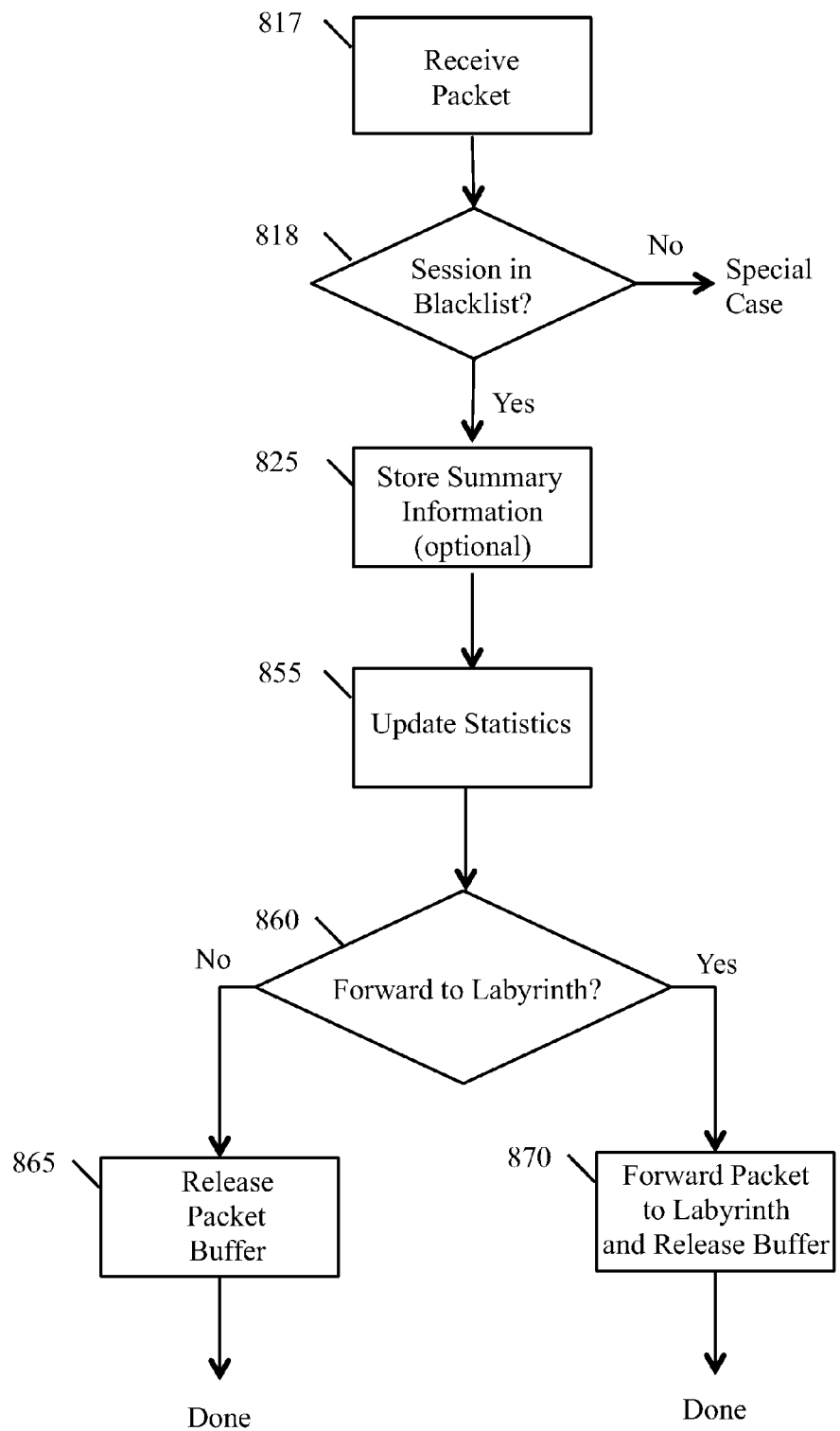
FIG. 8 is a process flow diagram of a method for identifying packets for forwarding to a labyrinth using a central module in accordance with an embodiment of the present invention.

FIG. 8 is a flowchart that shows the operation of a DTF Engine 477 that is cooperating with a Delta Engine 472 for determining if an incoming packet from the WAN 260 side has been dropped by the firewall 250, using a pending list, a whitelist, and a blacklist.

In step 817, the DTF Engine 477 receives a packet that the Delta Engine 472 has made available to it for further processing. In step 818, it examines the packet header for session-identifying information, and determines whether the identified session is in the blacklist. As described in connection with FIG. 7A, the Delta Engine will normally only hand off packets in blacklisted sessions to the DTF Engine 472. However, other embodiments may also hand off packets in whitelist or pending-list sessions. These are treated as special cases not described in the present disclosure.

From this point, operation is similar to that of the DTF Engine 477 that was described in connection with FIG. 6. The next, optional step 825 is to record certain summary information about the packet such as IP addresses, protocol, and port for attack profiling and other telemetry purposes. Such summary information may include the same items that were described in connection with step 625.

In step 855, the DTF Engine 477 updates statistics associated with a packet from a blacklisted session. It may gather needed information directly from the blocked packet or it may use summary information stored in step 825. The statistics may be subsequently gathered and/or synopsized by the Management Engine 482 as telemetry information to be sent to the CIS 262.

In step 860, the DTF Engine 477 determines whether the blocked packet should be forwarded to the Labyrinth 257 or 258 to engage the attacker. To make this determination, it may refer to the copy of the packet that was received or accessed in step 817 as well as the optional summary information saved in step 825. It may also refer to additional information and summaries that the Inspector 255 has created over the course of time, as well as information and summaries provided by outside entities such as the Cloud Inspection Service. After making a determination, the DTF Engine 477 may store its decision in the session's entry in the blacklist, and may later use this stored decision to make an immediate decision for subsequent packets received in the same session. Further details on how the determination is made are beyond the scope of the present disclosure.

If the DTF Engine 477 determines in step 860 not to forward the packet to Labyrinth 257 or 258, then it continues to step 865 where it releases the packet buffer immediately.

Otherwise, it continues to step 870 where it forwards the packet to Labyrinth 257 or 258 and releases the packet buffer after forwarding.

Operation of the Delta Engine 472 and the DTF Engine 477 for the reverse direction (packets coming in from the LAN 210 side destined for the WAN 260 side) is similar.

Enhancements can be made to the operations described above. As mentioned previously, the Firewall 250 may decide to block a session part-way through the session. To handle this situation, in step 740 above, a threshold may be set to prevent moving a session to the whitelist until the Firewall 250 has seen enough packets from the session to make a robust decision. Alternatively, step 711 could be modified to periodically hand off a whitelisted session's packet to step 715, so that if it is blocked by the Firewall 250, its session will be moved to the blacklist in step 760.

Conversely, it may be desired to guard more vigorously against false positives by requiring the Firewall 250 to drop two or more packets in a given session before the DTF Engine 477 places the session on the blacklist. This can be accomplished by maintaining a packet counter in the pending list, and moving the session to the blacklist in step 760 only when the required number of packets have been blocked.

Likewise, the Firewall 250 may be required to forward two or more packets in a given session before the Delta Engine 472 places the session on the whitelist. This can also be accomplished by maintaining a packet counter in the pending list, and moving the session to the whitelist in step 740 only when the required number of packets have been forwarded by the Firewall 250.

As will be understood by one skilled in the art, in a given session the DstIP/DstPort of packets going from the LAN 210 side to the WAN 260 side will generally be identical to the SrcIP/SrcPort of packets going in the reverse direction. This fact can be used to further enhance the Delta Engine's operation by checking the status of reverse-direction traffic in steps 711, 712, 714, 735, and 818.

As described below, the Cloud Inspector Service 262 may maintain and deliver to the Inspector 255 a list of blacklisted public IP addresses. Such a list may be used by the Delta Engine 472 or DTF Engine 477 to identify and place sessions on their own blacklist even if the Firewall 250 is not blocking them. In some embodiments, the CIS 262 may also maintain and deliver to the Inspector 255 a list of whitelisted IP addresses, which may also be used to guide decisions of the DTF 477.

In packet communications, most sessions are relatively short-lived. For example, a session may be initiated to communicate the contents of a web page, and a new session initiated when the user goes on to the next web page. Large file transfers require longer sessions, of course. In any case, sessions rarely exist for an extended period of time. Therefore entries in the whitelist, blacklist, and pending list in the foregoing description may advantageously be aged, and stale entries may be periodically purged, as will be understood by one skilled in the art.

Other steps and data structures may be used to perform the operations described above without departing from the spirit of the invention. For example, the whitelist, blacklist, and pending list may be combined into a single list whose entries have a field to indicate whether the identified session is whitelisted, blacklisted, or neither.

DTF-Engine Operation with No Delta Engine

Figure 9:
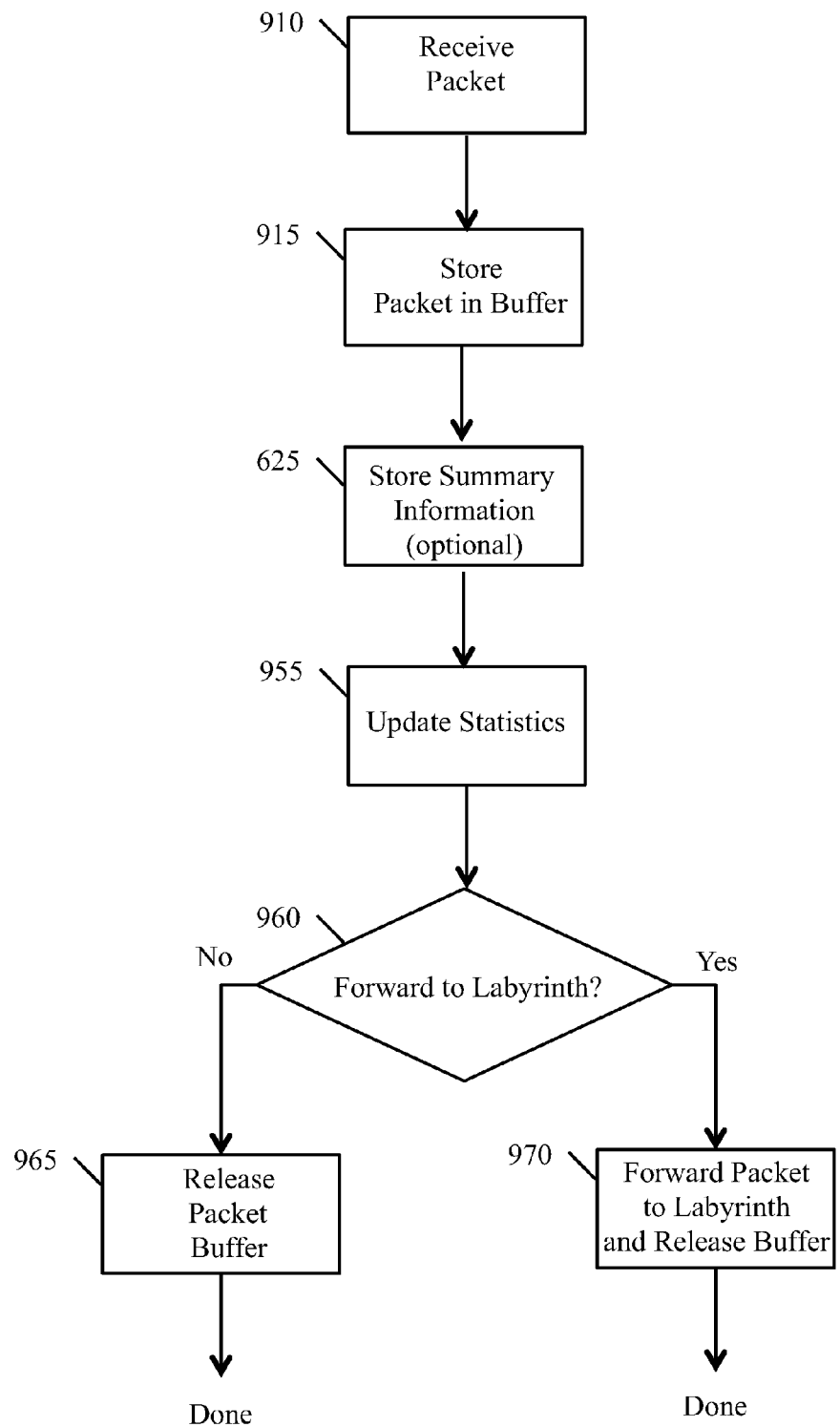
FIG. 9 is a process flow diagram of another method for identifying packets for transmitting to a labyrinth in accordance with an embodiment of the present invention.

FIGS. 4B and 4C showed block diagrams of an Inspector 255 with no Delta Engine, that are appropriate for use with the configurations of FIGS. 3C, 3D, and 3E. FIG. 9 is a simplified flowchart of the operations of the DTF Engine 477 in FIGS. 4B and 4C, including relevant operations from the flowchart in FIG. 8. In step 910, the DTF Engine 477 marks (FIG. 4B) or receives (FIG. 4C) for further processing a packet blocked by Firewall 250. As will be understood by one familiar with the art, the packet may or may not already be stored in an appropriate buffer depending on details of the handoff of the packet from the network or firewall to the Inspector 255. In step 915, the Inspector 255 stores the packet into a buffer if it is not already stored in one.

Additional information may be provided with the buffered packet, such as the origin of the packet (Corporate/LAN 210 side or Internet/WAN 260 side) and the firewall rule or rules that caused the packet to be blocked. In FIG. 4B (rules emulation), this information could be stored along with the buffered packet during rules emulation; in FIGS. 4C and 3D (enhanced firewall) the packet could be tagged or encapsulated with such information; in FIGS. 4C and 3E (integrated firewall and inspector) the best method would depend on how the firewall and inspector were integrated; and in all cases as readily determined by one familiar with the art.

In step 925, the Inspector 255 optionally stores summary information about the incoming packet. Such summary information may include the same items that were described in connection with steps 625 and 825.

In step 955, the Inspector 255 may update statistics and other information relating to the blocked packet. The Inspector 255 may refer to the buffered copy of the packet from step 915 or to the optional summary information saved in step 925 to create such statistics and other information.

In step 960, the Inspector 255 determines whether the blocked packet should be forwarded to the Labyrinth 257 or 258 to engage the attacker. It may refer to the copy of the packet that was buffered in step 915 as well as the optional summary information saved in step 925 to make this determination. It may also refer to additional information and summaries that the Inspector 255 has created over the course of time, as well as information and summaries provided by outside entities such as the Cloud Inspection Service. Further details on how the determination is made are beyond the scope of the present disclosure.

If step 960 determines not to forward the blocked packet, then in step 965 the Inspector 255 releases the packet's buffer, freeing it up for use with another received packet. If step 960 determines to forward the blocked packet to the Labyrinth 257 or 258 to engage the attacker, then step 970 forwards the blocked packet and arranges to release, once no longer needed, the packet's buffer.

DTF-Engine Forwarding Operations

As described previously, the DTF Engine 477 may forward blocked packets to the Labyrinth 257 or 258 to engage an attacker 290. The methods used for such forwarding may be proprietary and may advantageously be used in various embodiments disclosed herein.

Each packet that the DTF Engine 477 forwards to the Labyrinth 257 or 258 is sent without modification, encapsulated inside another packet using any of a variety of available encapsulation protocols understood by one skilled in the art. Such encapsulation protocols include IP-in-IP, Generic Routing Ecapsulation (GRE), and MPLS tunnels.

In the reverse direction, the Labyrinth 257 or 258 responds to an attacker 290 by returning response packets to the attacker 290 who is located in the Internet/WAN 260 or, in some cases, in the corporate network/LAN 210. However, such packets are not sent directly to the attacker 290. Instead, they are encapsulated and sent to the Inspector 255. The DTF Engine 477 receives each response packet, removes the encapsulation, and sends the unencapsulated response packet to the attacker 290 using its connection to the WAN 260 or the LAN 210.

In this way, the attacker 290 cannot determine, simply by looking at transport information in response packets, that its traffic has been diverted. If the packets were not encapsulated, the attacker could determine, for example, that a packet had undergone additional network hops through routers between the attacker and its supposed target.

Encapsulation also provides a facility for the DTF Engine 477 and the Labyrinth 257 or 358 to communicate "out-of-band" information concerning the attack. For example, in addition to the complete attack packet itself, the DTF Engine 477 could include additional information indicating the reason that the packet was considered malicious, which could guide the Labyrinth's method of engaging the attacker. Or, it could indicate that the packet's identification as being part of a malicious session is tentative; if the DTF Engine 477 subsequently determines that the session is not malicious, it can instruct the Labyrinth 257 or 258 to "unwind" its attack engagement activities. For example, the Labyrinth 257 or 258 could stop any ongoing activities and release any internal resources associated with "malicious" session, and purge any statistics it has created concerning the engagement.

Encapsulation also provides a facility for the DTF Engine 477 to unconditionally terminate an engagement between a possible attacker 290 and the Labyrinth 257 or 258. In the previous example, the DTF Engine 477 may forward to the Labyrinth 257 or 258 a packet whose session has been only tentatively identified as being malicious. This allows the Labyrinth 257 or 258 to prepare a response packet immediately, and reduces the chance that the attacker 290 will notice delay in responses and suspect it has been engaged by the Labyrinth. When the DTF Engine 477 subsequently receives the response packet from the Labyrinth 257 or 258, it can decide at that time whether or not to actually remove the encapsulation and forward to the possible attacker 290. This minimizes the time for responding to a potential attacker while maximizing the time available for determining if it is a real attacker.

The DTF Engine 477 may determine that a response packet from the Labyrinth 257 or 258 is part of a particular session by referring to the session information in the packet. The DTF Engine 477 may also do this by assigning a unique, private "session number" to each session, including it in the "out-of-band" information in each packet that it encapsulates and sends to the Labyrinth 257 or 258, and having the Labyrinth include that private session number with the response packets that it sends back to the DTF Engine 477.

In some embodiments, encapsulated packets between the DTF Engine 477 and the Labyrinth 257 or 258 may be encrypted, using methods understood by one familiar with the art. Such methods include IPsec and SSL (Secure Sockets Layer).

Other Inspector Functions

The Inspector 255 may have the ability to "shut down" communications between an attacker 290 and a target 220 in the corporate network/LAN 210. This is useful if the firewall does not detect the attack, that is, if it has not been configured with rules that detect and block the attack. As discussed earlier, the Inspector 255 may "blacklist" a session even if the firewall is not blocking it, for example if the session involves an IP address that is on a list of known malicious IP addresses which the Inspector 255 has received from the CIS 262. After shutting down a blacklisted session, the Inspector 255 still has the opportunity to attempt to engage the attacker using the Labyrinth 257 or 258.

There are several ways that the Inspector 255 can shut down a session that the Firewall 250 is not currently blocking.

The first way is for the Inspector 255 to configure and install a new rule or rules in the Firewall 250 that will block packets in the offending session, for example, to block all traffic from or to the offending IP address. This approach may require the Inspector 255 to have a network connection to the Firewall 250's (which it already does, at least in one direction for the purpose of inspecting outgoing packets), and permission to access the firewall's remote-management interface. Perhaps more significantly, it also requires software in the Inspector 255 to be aware of the protocol and format used by configuration commands for the particular model of firewall. While not as complex as the Rules Emulation approach discussed earlier, it may use a practical Inspector product's software to support the configuration protocols and formats for many different firewall products.

A second way to block a session is for the Inspector 255 to configure and install "custom filtering rules (CFRs)" or "access control list (ACL)" entries in the packet switch or router that connects the Firewall 250 to the LAN 210 or the WAN 260 to block all traffic to or from the offending IP address. This again requires a connection to the switch (which it already has), access to the switch's remote-management interface, and awareness of the protocol and format used by configuration commands for the particular model of switch. A practical simplification from the previous case is that there are relatively few switch/router vendors who provide products suitable for the edge of the corporate network, and such switches typically can be configured with CFRs or ACLs to block traffic to or from selected IP addresses.

A third way, when all LAN-WAN traffic is actually flowing through the Inspector in the approach of FIG. 3B, is to simply block traffic in the offending session between the Inspector 255 and the Firewall 250 and therefore between the LAN and WAN.

A fourth way, when using the enhanced or integrated approach of FIG. 3D or 3E, is to use the existing direct interface between the Firewall 250 and the Inspector 255. By sending an appropriate message to the Firewall 250 using this interface, the Inspector 255 may simply direct it to block sessions involving the offending IP address.

A fifth way works especially well with TCP sessions, and does not require the Inspector 255 to have any special connection to the Firewall 250 or any access to its configuration interface. To shut down an offending TCP session, the Inspector 255 sends one or more TCP RST ("Reset") and/or FIN ("Finished") packets to the target 220. When creating these packets, it masquerades as the attacker 290; that is, it uses the attacker's source IP address and port number, so the target will believe that the attacker is trying to shut down the connection and will therefore terminate the session. If desired, the Inspector 255 may also send TCP RST and/or FIN packets to the attacker 290. Unless the attacker's software has been modified to ignore these packets selectively during an attack, this will also stop the attack. However, when used repeatedly the latter approach may also warn the attacker that the attack is being disrupted by an Inspector. The approach of redirecting traffic intended for one participant in a TCP session to a different participant by sending an appropriate RST packet and then masquerading as the original participant is known in the art as "RST hijacking" Other ways for an Inspector to disrupt an attack by sending packets to the attacker or the target, including approaches that work with other protocols, may be devised by one skilled in the art.

A disadvantage of the fifth way of blocking sessions is that the disruption may preclude the attacker 290 from being engaged effectively through the Labyrinth 257 or 258. (Additional packets sent by the attacker 290 would be received by the target 220 as well as by the Labyrinth 257 or 258, and may or may not be properly ignored by the target 220.) However, at least it protects the target 220 until other steps can be taken to block the attacks, such as adding rules to the Firewall 250. Subsequently, it may be possible to nondisruptively and effectively engage a new attack through the Labyrinth 257 or 258.

CIS Communications and Functions

Returning to FIG. 2, some embodiments include a Cloud Inspector Service (CIS) 262, which collects information from Inspectors 255 and Labyrinths 257 and 258, and also sends information to the same. The CIS 262 may be implemented with a server or servers running appropriate software, and it may be located anywhere in the cloud; that is, it need not be co-located with the corporate network/LAN 210 that is being protected by the systems disclosed herein.

The purpose of the Cloud Inspector Service (CIS) 262 is to process telemetry data sent from the Inspectors 255 and Labyrinths 257 and 258. A CIS 262 may communicate with multiple Inspectors 255 in the same corporate network 210, including Inspectors 255 that are located at multiple geographical sites of the same corporation. A CIS 262 may also communicate with Inspectors 255 at multiple sites of multiple corporations.

A CIS 262 may also share information with other CISs 262 connected to other corporate networks 210 and/or hierarchically with higher-level CISs 262 in order to aggregate information from multiple corporations and sites.

The CIS 262 may maintain and deliver to the Inspectors 255 a list of blacklisted public IP addresses. It may use multiple methods to add IP addresses to this blacklist. For example, the CIS 262 may add addresses who have attacked and been blocked by customer networks at least a certain number of times as determined by telemetry data delivered by Inspectors 255 in those networks. The CIS 262 may add addresses that have been published in a trusted, publicly or privately available list of IP addresses known for malicious behavior, such as Alienvault and SpamHaus. As discussed previously, the Inspectors 255 may automatically blacklist sessions involving such blacklisted IP addresses even if the associated firewall 250 is not blocking them. Conversely, the CIS 262 may maintain and deliver to the Inspectors 255 a list of whitelisted public IP addresses. Such trusted addresses may be published by a trusted sources, or may be configured by administrators of the systems disclosed herein, and may further guide the operations of the Inspectors 255.

Using telemetry information received from Inspectors at multiple corporations and sites, the CIS 262 is well positioned to address risky, imperfect, or anomalous behavior of the sites. Each site that is protected by an Inspector 255 may use a different model of Firewall 250, and even ones with the same model may have different rules configured in them. Using the telemetry information, the CIS 262 may determine that a particular traffic pattern, or traffic from a particular Internet address, is being blocked by one or more sites but not by others. This may be an indication of a possibly successful attack at the non-blocking sites.

Likewise, by receiving and correlating information from multiple corporations, sites, and CISs 262, the CIS 262 is well positioned to detect and address so-called "zero day attacks," wherein an attacker attempts to exploit a previously unknown vulnerability. Such attacks are called "zero day" because administrators of the targeted system have zero days to address the vulnerability, for example by installing new rules in their firewalls 250. The CIS 262 may notice patterns of suspicious activity at multiple sites, suspicious for example because of heightened activity of a particular sensitive type at the multiple sites, all being initiated by the same suspected attacker or multiple attackers in the same network.

After noticing such behaviors, the CIS 262 may take actions to protect the targeted sites. Such actions may be relatively passive, for example, sending emails or text messages to sites' system administrators to warn of the possible attack, allowing the system administrators to evaluate and take action manually, for example, installing new rules on their firewalls.

Such CIS 262 actions may also be proactive and aggressive, for example, instructing the Inspector(s) 255 to shut down the connections between the attacker(s) and each target using one of the methods described previously. In the cases of installing new rules, CFRs, and/or ACLs on existing firewalls, switches, and routers in response to attacks or threats, the CIS 262 may be programmed and configured to give the CIS 262 direct access to these devices for the purpose of automatically installing such protections, rather than instructing the Inspector(s) 255 to install such protections.

Labyrinth Functions

As explained previously, traffic from an attacker 290 that is being blocked by the Firewall 250 (or in some cases by the Inspector 255) may be redirected through the Inspector 255 to Labyrinth 257 or 258 for the purpose of engaging the attacker 290. Such traffic may be encapsulated in both directions, so that the attacker 290 cannot determine from the content of received packets that such traffic has been redirected. Such encapsulated traffic may also be encrypted if required for additional security.

The Labyrinth 257 or 258 may be implemented with a server or servers running appropriate software. Such software includes multiple processes that emulate various elements of the real corporate network, including workstations, servers, websites, databases, and networking devices such as routers that would normally be detectable, distinguishable, and available to internal or external users of the real corporate network/LAN 210.

In the case that multiple servers are used to implement the Labyrinth 257 or 258, they may be connected to each other through a physical network including links, switches, and routers that are configured to emulate a portion of the corporate network/LAN 210. The goal of such a configuration is to make the attacker 290 believe that its traffic is entering and being carried on the real corporate network.

Alternatively, multiple processes emulating multiple servers may be connected through virtual networks, such as the networks connecting virtual machines inside a hypervisor, or through private networks connecting multiple physical servers in a cloud-computing environment, or through a combination thereof, as will be understood by one skilled in the art. Within a virtual-network or cloud-computing environment the network configuration that is ultimately visible to the attacker 290 by examining received traffic may advantageously emulate a portion of the corporate network/LAN 210, to make the attacker 290 believe that its traffic is entering and being carried on the real corporate network/LAN 210.

With reference to FIG. 2, the Labyrinth 257 is physically located within the corporate network/LAN 210. However, a Labyrinth 258 may be located anywhere in the cloud as shown in the figure; that is, it need not be co-located with the corporate network/LAN 210 that is being protected by the systems disclosed herein.

Besides software that emulates various elements of the real corporate network, the Labyrinth 257 or 258 also contains software to track various aspects of attempted attacks. Such software includes:

- Tracking and logging the behavior of an attacker 290.
- Identifying an attacker 290 with context awareness (not just by IP address).
- Analytics to track trends and measure the success in engaging attackers 290 and reducing attacks.
- Heuristics to lure attackers deeper into the emulated services in the Labyrinth 257 or 258, to waste the attacker 290's time by increasing the duration of an attempted but redirected attack.

Labyrinths 257 and 258 may send tracking, logging, and analytics information to the CIS 262 for the purpose of summarizing and correlating with information from other Labyrinths. Further details of the Labyrinth's operation are beyond the scope of the present disclosure.

Operation without a Labyrinth

The benefits of the Labyrinth's functions are apparent from the above discussion. However, some corporate networks may obtain sufficient benefit to deploy systems described herein without a Labyrinth. Benefits described previously, and available through the Inspector 255 and the CIS 262 without a Labyrinth 257 or 258, include:

- Correlation and analysis of telemetry data received from the Inspector(s) 255 by the CIS 262.
- CIS 262 providing summary reports about attacks and other suspicious activity.
- CIS 262 alerting the network administrator about specific attacks and suspicious activity.
- Distribution of learned or otherwise known blacklist IPs from the CIS 262 to the Inspector(s) 255
- In the case of multiple Inspectors 255, information sharing by the CIS 262 about attacks and blacklisted IPs among multiple network entry points and networks.
- Ability of the Inspector 255 to shut down malicious sessions which the Firewall 250 is allowing to pass through.
- Automatically installing new rules, CFRs, and/or ACLs on existing firewalls, switches, and routers in response to attacks or threats.

Management Server Functions and Communication

The Management Server 263 is used to manage Inspectors 255, Cloud Inspector Services 262, and Labyrinths 257 and 258. Most users of the systems and methods disclosed herein may prefer to locate the Management Server 263 within the corporate network LAN 210 for security and other reasons, as shown in FIG. 2, but it is also possible to locate it (or almost any other resource) in the cloud, as well as to locate its services on the same physical server that provides other services, as will be understood by one familiar with the art.

The Management Server 263 provides the corporate network manager with a centralized means of configuring the Inspector 255, the Labyrinths 257 and 258, and the CIS 262. Similar to other network management tools, it may provide both tabular and visual displays of the system being managed, including devices, services, and activities.

Operational parameters that may be configured through the Management Server 263 include all the maximum transit times used by Delta Engines 472, various decision thresholds used by DTF Engines 477, and parameters used by various algorithms and heuristics (not disclosed here) in the CIS 262. Of course the Management Server 263 may store credentials that allow it to obtain secure access to the elements of the system that it is directly managing. Additionally, the Management Server 263 may store and use or distribute configuration information, passwords, and the like for other networks elements such as firewalls, switches, and routers.

While the CIS 262 consolidates and correlates attack activity and blacklist information for distribution among the Inspectors 255, it is the Management Server 263's function to format such information in human-readable format and provide a means for the network manager to retrieve it. Likewise, while the CIS 262 may determine that particular suspicious activity should be brought to the attention of network managers, it is the Management Server 263's function to actually create and deliver such alerts. The Management Server 263 provides a central facility at which alerting policies and other information, such as email addresses and mobile numbers of network managers, can be configured and stored.

Figure 10:
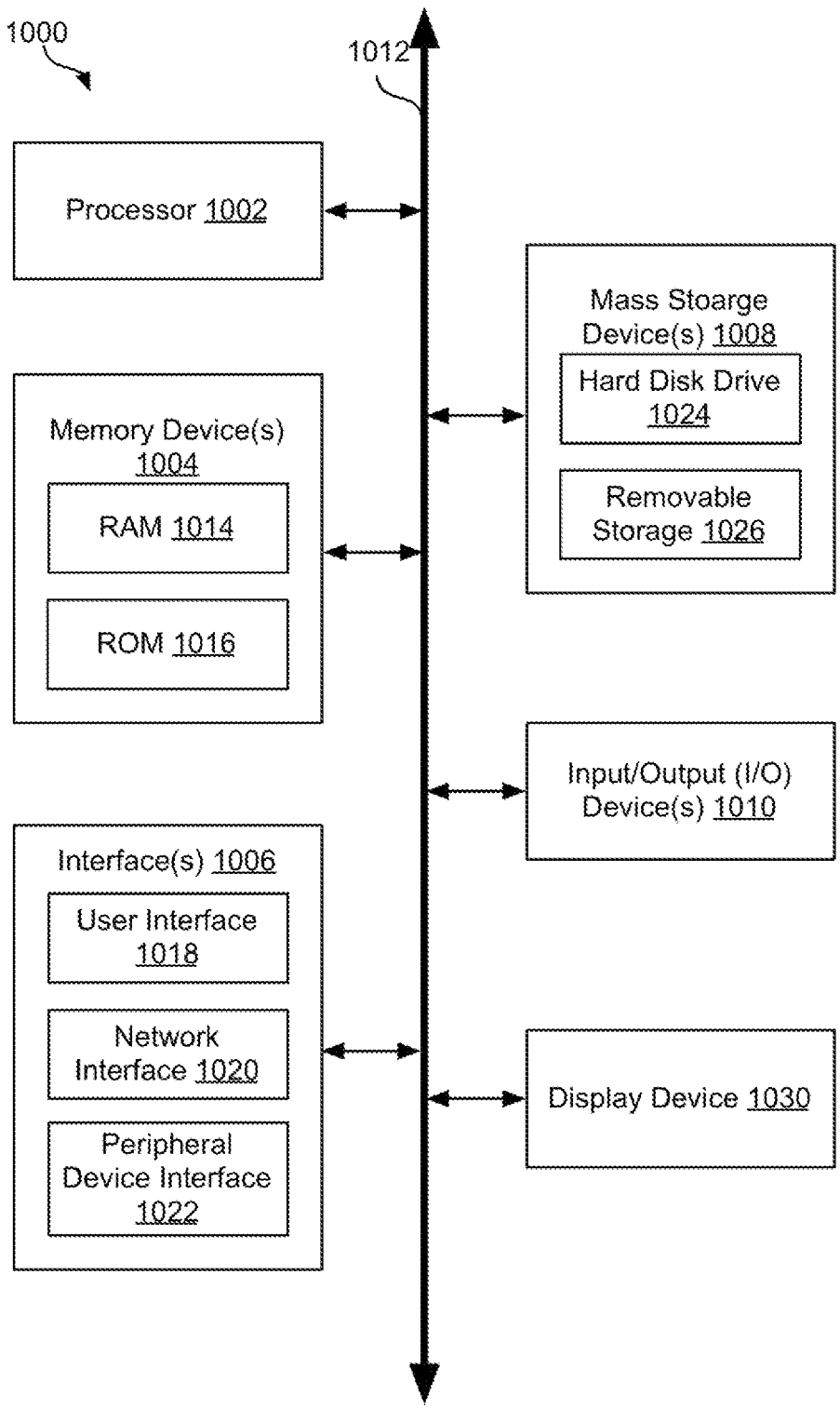
FIG. 10 is a schematic block diagram illustrating an example computing device for implementing the methods disclosed herein.

FIG. 10 is a block diagram illustrating an example computing device 100. Computing device 1000 may be used to perform various procedures, such as those discussed herein. Computing device 1000 can function as a server, a client, or any other computing entity. Computing device can perform various monitoring functions as discussed herein, and can execute one or more application programs, such as the application programs described herein. Computing device 1000 can be any of a wide variety of computing devices, such as a desktop computer, a notebook computer, a server computer, a handheld computer, tablet computer and the like.

Computing device 1000 includes one or more processor(s) 1002, one or more memory device(s) 1004, one or more interface(s) 1006, one or more mass storage device(s) 1008, one or more Input/Output (I/O) device(s) 1010, and a display device 1030 all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM) 1014) and/or nonvolatile memory (e.g., read-only memory (ROM) 1016). Memory device(s) 1004 may also include rewritable ROM, such as Flash memory.

Mass storage device(s) 1008 include various computer readable media, such as magnetic tapes, magnetic disks, optical disks, solid-state memory (e.g., Flash memory), and so forth. As shown in FIG. 10, a particular mass storage device is a hard disk drive 1024. Various drives may also be included in mass storage device(s) 1008 to enable reading from and/or writing to the various computer readable media. Mass storage device(s) 1008 include removable media 1026 and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, lenses, CCDs or other image capture devices, and the like.

Display device 1030 includes any type of device capable of displaying information to one or more users of computing device 1000. Examples of display device 1030 include a monitor, display terminal, video projection device, and the like.

Interface(s) 1006 include various interfaces that allow computing device 1000 to interact with other systems, devices, or computing environments. Example interface(s) 1006 include any number of different network interfaces 1020, such as interfaces to local area networks (LANs), wide area networks (WANs), wireless networks, and the Internet.

Other interface(s) include user interface 1018 and peripheral device interface 1022. The interface(s) 1006 may also include one or more user interface elements 1018. The interface(s) 1006 may also include one or more peripheral interfaces such as interfaces for printers, pointing devices (mice, track pad, etc.), keyboards, and the like.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, IEEE 10394 bus, USB bus, and so forth.

For purposes of illustration, programs and other executable program components are shown herein as discrete blocks, although it is understood that such programs and components may reside at various times in different storage components of computing device 1000, and are executed by processor(s) 1002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A system comprising:
    an internal network including a plurality of computing devices;
    a firewall module connecting the internal network to an external network, the firewall module configured to
        receive first packets addressed between the internal network and the external networks and output second packets to the internal network and external networks, the second packets being a portion of the first packets, the second packets determined by the firewall module not to be suspicious, the second packets not including a blocked portion of the first packets addressed between the internal network and external networks, the blocked portion being a portion of the first packets determined by the firewall module to be suspicious;
    an inspector module configured to
        receive the first packets;
        receive the second packets during a first time window and store the first packets in a buffer in a memory device;
            receive a whitelist identifying sessions that the firewall module did not block, a first blacklist identifying sessions that were blocked by the firewall module and a second blacklist of blacklisted IP addresses;
        refrain from detecting first packets corresponding to the whitelist as included in the blocked portion;
        identify as part of the blocked portion first packets corresponding to the second blacklist regardless of whether the first packets corresponding to the second blacklist are actually blocked by the firewall module and blacklist a session with first packets corresponding to the second blacklist when the session is not in the first blacklist;
        compare each second packet of the second packets with each first packet of the first packets and, when a first packet of the first packets matches a second packet of the second packets, the first packet that matches the second packet is designated as not being part of the blocked portion and is removed by a second computer processing device of the inspector module from the buffer without being forwarded to a central module; and
        for each first packet of the first packets stored in the buffer, when each first packet has been in the buffer for more than a predetermined delay, identify each first packet as a blocked packet of the blocked portion and remove, by the second computer processing device, the blocked packet from the buffer and forward the blocked packet to the central module;
    wherein the predetermined delay is determined from a portion of the second packets by:
        generating a group of transit delays by determining a transit delay for each second packet in the portion of second packets by measuring a difference between a second time stamp for each second packet in the portion and a first time stamp for the first packet stored in the buffer that matches the second packet;
        identifying a first largest transit delay among the transit delays for the portion of the second packets; and
        setting the predetermined delay to be equal to the first largest transit delay plus a predetermined safety margin;
    a central module configured to receive packets forwarded from the inspector module, analyze the packets and forward the packets to a labyrinth, wherein the labyrinth generates simulated responses corresponding to those of an operational network;
    wherein the firewall module is executed by a first computing device and the inspector module is executed by the second computing device that is distinct and separate from the first computing device.

2. The system of claim 1, wherein the inspector module is configured to determine when each second packet matches the first packet of the first packets by:
    comparing a second header of each second packet to first headers of the first packets without examining payload data of each second packet and the first packets;
    determine that the second packet matches the first packet when the second header matches a first header of the first packet.

3. The system of claim 2, wherein the inspector module is configured to compare the second header to the first headers by comparing at least one of source internet protocol (IP) address fields, destination IP address fields, source port fields, and destination port fields of the second header and first headers.

4. The system of claim 3, wherein:
    the firewall module is further configured to perform network address translation (NAT) with respect to addresses of the computing devices in the internal network;
    the inspector module is further configured to compare only source IP address and source port fields of the second header and first headers corresponding to traffic from the external network to the internal network; and
    the inspector module is further configured to compare only destination IP address and destination port fields of the second header and first headers corresponding to traffic from the internal network to the external network.

5. The system of claim 1, further comprising:
   identifying a second largest transit delay different from the first largest transit delay among the transit delays during a second time window subsequent to the first time window; and
   using the second largest transit delay to set the predetermined delay subsequent to the second time window and subsequent to using the first largest transit delay to set the predetermined delay.

6. The system of claim 1, wherein the inspector module is further configured to:
   identify one or more first sessions represented by any of the first packets identified as blocked packets of the blocked portion; and
   transmit first subsequent packets of the first packets received subsequent to the blocked packets to the central module as part of the blocked portion without comparing the first subsequent packets to the second packets.

7. The system of claim 6, wherein the inspector module is further configured to:
   identify one or more second sessions represented by non-blocked packets of first packets, the non-blocked packets including packets other than the first packets identified as blocked packets; and
   refrain from transmitting second subsequent packets of the first packets received subsequent to the non-blocked packets to the central module as part of the blocked portion without comparing the second subsequent packets to the second packets.

8. The system of claim 1, wherein the central module is further configured to:
   identify an address associated with blocked packets of the blocked portion;
   determine that one or more second firewall modules did not block unblocked packets of the first packets corresponding to the address; and
   in response to determining that one or more second firewall modules did not block the unblocked packets of the first packets corresponding to the address, instruct a second inspector module associated with the one or more second firewall modules to invoke blocking of first packets corresponding to the address.

9. A system comprising:
   an internal network including a plurality of computing devices;
   a plurality of firewall modules, each firewall of the plurality of firewall modules connecting the internal network to an external network, each firewall configured to
      receive input traffic directed between the internal network and external network;
      evaluate the input traffic for suspicious activity;
      output output traffic, the output traffic being a portion of the input traffic, the output traffic determined not to be suspicious; and
      refrain from outputting a blocked portion of the input traffic, the blocked portion determined to be suspicious by the plurality of firewall modules, the plurality of firewall modules configured to refrain from transmitting the blocked portion between the internal network and external network;
   a plurality of inspector modules each configured to
      receive the first packets of the input traffic;
      receive second packets during a first time window and store the first packets of the input traffic in a buffer in a memory device;
      receive a whitelist identifying sessions that the firewall modules did not block, a first blacklist identifying sessions that were blocked by the firewall modules and a second blacklist of blacklisted IP addresses;
      refrain from detecting first packets corresponding to the whitelist as included in the blocked portion;
      identify as part of the blocked portion first packets corresponding to the second blacklist regardless of whether the first packets corresponding to the second blacklist are actually blocked by the firewall modules and blacklist a session with first packets corresponding to the second blacklist when the session is not in the first blacklist;
      compare each second packet of the second packets with each first packet of the first packets and, when a previously-stored first packet of the first packets matches a second packet of the second packets, the previously-stored first packet that matches the second packet is designated as not being part of the blocked portion and is removed by a second computer processing device of the inspector modules from the buffer without being forward to a central module;
      for each first packet of the first packets stored in the buffer, when each first packet has been in the buffer for more than a threshold time, identify each first packet as a blocked packet of the blocked portion and remove, by the second computer processing device, the blocked packet from the buffer and forward the blocked packet to the central module;
      wherein the threshold time is determined from a portion of the second packets by:
         generating a group of transit delays by determining a transit delay for each second packet in the portion of second packets by measuring a difference between a second time stamp for each second packet in the portion and a first time stamp for the first packet stored in the buffer that matches the second packet;
         identifying a first largest transit delay among the transit delays for the portion of the second packets; and
         setting the threshold time to be equal to the first largest transit delay plus a predetermined safety margin;
   wherein the central module is configured to —
      receive the first packets forwarded from each inspector module of the plurality of inspector modules, the first packets forwarded from each inspector module being part of the blocked portion;
      analyze at least the part of the blocked portion received from each inspector module of the plurality of inspector modules; and
      perform a predetermined action based on the analyzing of at least the part of the blocked portion comprising transmitting at least the part of the blocked portion to a labyrinth module configured to generate simulated responses corresponding to those of an operational network;
   wherein the plurality of firewall modules are executed by first computing devices and the plurality of inspector modules are executed by second computing devices that are distinct and separate from the first computing devices.

10. The system of claim 9, wherein the central module is further configured to:
   identify an address associated with blocked packets of the blocked portion;

determine that one or more second firewalls of the plurality of firewall modules did not block unblocked packets of the first packets corresponding to the address; and in response to determining that one or more second firewall modules of the plurality of firewall modules did not block the unblocked packets of the first packets corresponding to the address, instruct inspector modules of the plurality of inspector modules associated with the one or more second firewall modules to invoke blocking of first packets corresponding to the address.

11. The system of claim 9, wherein the central module is configured to perform the predetermined action by determining statistics based on at least the part of the blocked portion received from each inspector module of the plurality of inspector modules.

12. The system of claim 9, wherein the plurality of inspector modules are each configured to compare a second header of each second packet to first headers of the first packets stored in the buffer without examining payload data of each second packet and the first packets; and determine that the second packet matches the previously-stored first packet when the second header matches a first header of the first headers.

\* \* \* \* \*